(12) United States Patent
Raleigh

(10) Patent No.: US 12,488,090 B2
(45) Date of Patent: Dec. 2, 2025

(54) SECURITY TECHNIQUES FOR DEVICE ASSISTED SERVICES

(71) Applicant: Headwater Research LLC, Tyler, TX (US)

(72) Inventor: Gregory G. Raleigh, Incline Village, NV (US)

(73) Assignee: Headwater Research LLC, Tyler, TX (US)

(*) Notice: Subject to any disclaimer, the term of this patent is extended or adjusted under 35 U.S.C. 154(b) by 0 days.

(21) Appl. No.: 18/604,106

(22) Filed: Mar. 13, 2024

(65) Prior Publication Data

US 2024/0248981 A1  Jul. 25, 2024

Related U.S. Application Data

(63) Continuation of application No. 17/867,585, filed on Jul. 18, 2022, now Pat. No. 11,966,464, which is a
(Continued)

(51) Int. Cl.
   *G06F 21/55* (2013.01)
   *G06F 15/177* (2006.01)
   (Continued)

(52) U.S. Cl.
   CPC ............ *G06F 21/53* (2013.01); *G06F 15/177* (2013.01); *G06F 21/55* (2013.01);
   (Continued)

(58) Field of Classification Search
   CPC .. G06Q 10/06375; G06Q 20/20; G06Q 20/40; G06Q 30/0207; G06Q 30/0283;
   (Continued)

(56) References Cited

U.S. PATENT DOCUMENTS

5,131,020 A   7/1992  Liebesny et al.
5,283,904 A   2/1994  Carson et al.
(Continued)

FOREIGN PATENT DOCUMENTS

CA   2688553 A1   12/2008
CN   1310401 A    8/2001
(Continued)

OTHER PUBLICATIONS

"Ads and movies on the run," the Gold Coast Bulletin, Southport, Qld, Jan. 29, 2008.
(Continued)

*Primary Examiner* — Benjamin A Kaplan
(74) *Attorney, Agent, or Firm* — Farjami & Farjami LLP

(57) ABSTRACT

Security techniques for device assisted services are provided. In some embodiments, secure service measurement and/or control execution partition is provided. In some embodiments, implementing a service profile executed at least in part in a secure execution environment of a processor of a communications device for assisting control of the communications device use of a service on a wireless network, in which the service profile includes a plurality of service policy settings, and wherein the service profile is associated with a service plan that provides for access to the service on the wireless network; monitoring use of the service based on the service profile; and verifying the use of the service based on the monitored use of the service.

20 Claims, 11 Drawing Sheets

Related U.S. Application Data continuation of application No. 16/907,887, filed on Jun. 22, 2020, now Pat. No. 11,405,429, which is a continuation of application No. 16/034,362, filed on Jul. 13, 2018, now Pat. No. 10,694,385, which is a continuation of application No. 14/948,065, filed on Nov. 20, 2015, now Pat. No. 10,028,144, which is a continuation of application No. 13/737,748, filed on Jan. 9, 2013, now Pat. No. 9,198,042, which is a continuation of application No. 12/694,445, filed on Jan. 27, 2010, now Pat. No. 8,391,834, which is a continuation-in-part of application No. 12/380,780, filed on Mar. 2, 2009, now Pat. No. 8,839,388.

(60) Provisional application No. 61/252,151, filed on Oct. 15, 2009, provisional application No. 61/207,739, filed on Feb. 13, 2009, provisional application No. 61/207,393, filed on Feb. 10, 2009, provisional application No. 61/206,944, filed on Feb. 4, 2009, provisional application No. 61/206,354, filed on Jan. 28, 2009.

(51) Int. Cl.

| | |
|---|---|
| *G06F 21/53* | (2013.01) |
| *G06Q 10/0631* | (2023.01) |
| *G06Q 10/0637* | (2023.01) |
| *G06Q 20/10* | (2012.01) |
| *G06Q 20/20* | (2012.01) |
| *G06Q 20/40* | (2012.01) |
| *G06Q 30/0207* | (2023.01) |
| *G06Q 30/0241* | (2023.01) |
| *G06Q 30/0283* | (2023.01) |
| *G06Q 30/04* | (2012.01) |
| *G06Q 30/0601* | (2023.01) |
| *G06Q 40/00* | (2023.01) |
| *G06Q 40/12* | (2023.01) |
| *H04L 9/32* | (2006.01) |
| *H04L 9/40* | (2022.01) |
| *H04L 12/14* | (2024.01) |
| *H04L 41/0806* | (2022.01) |
| *H04L 41/0893* | (2022.01) |
| *H04L 41/5003* | (2022.01) |
| *H04L 41/5054* | (2022.01) |
| *H04L 47/20* | (2022.01) |
| *H04L 47/2408* | (2022.01) |
| *H04L 51/046* | (2022.01) |
| *H04L 67/145* | (2022.01) |
| *H04L 67/306* | (2022.01) |
| *H04L 67/55* | (2022.01) |
| *H04L 67/63* | (2022.01) |
| *H04M 15/00* | (2006.01) |
| *H04W 4/02* | (2018.01) |
| *H04W 4/12* | (2009.01) |
| *H04W 4/18* | (2009.01) |
| *H04W 4/20* | (2018.01) |
| *H04W 4/24* | (2018.01) |
| *H04W 4/50* | (2018.01) |
| *H04W 8/18* | (2009.01) |
| *H04W 8/20* | (2009.01) |
| *H04W 12/00* | (2021.01) |
| *H04W 12/02* | (2009.01) |
| *H04W 12/037* | (2021.01) |
| *H04W 12/06* | (2021.01) |
| *H04W 12/08* | (2021.01) |
| *H04W 12/088* | (2021.01) |
| *H04W 24/08* | (2009.01) |
| *H04W 28/02* | (2009.01) |
| *H04W 28/12* | (2009.01) |
| *H04W 48/14* | (2009.01) |
| *H04W 48/16* | (2009.01) |
| *H04W 72/0453* | (2023.01) |
| *H04W 88/08* | (2009.01) |
| *H04L 41/08* | (2022.01) |
| *H04L 41/5025* | (2022.01) |
| *H04L 67/00* | (2022.01) |
| *H04L 67/564* | (2022.01) |
| *H04W 8/02* | (2009.01) |
| *H04W 84/04* | (2009.01) |
| *H04W 84/12* | (2009.01) |
| *H04W 88/06* | (2009.01) |

(52) U.S. Cl.
CPC . *G06Q 10/06315* (2013.01); *G06Q 10/06375* (2013.01); *G06Q 20/102* (2013.01); *G06Q 20/20* (2013.01); *G06Q 20/40* (2013.01); *G06Q 30/0207* (2013.01); *G06Q 30/0241* (2013.01); *G06Q 30/0283* (2013.01); *G06Q 30/0284* (2013.01); *G06Q 30/04* (2013.01); *G06Q 30/0601* (2013.01); *G06Q 40/00* (2013.01); *G06Q 40/12* (2013.12); *H04L 9/32* (2013.01); *H04L 9/3247* (2013.01); *H04L 12/14* (2013.01); *H04L 41/0806* (2013.01); *H04L 41/0893* (2013.01); *H04L 41/5003* (2013.01); *H04L 41/5054* (2013.01); *H04L 47/20* (2013.01); *H04L 47/2408* (2013.01); *H04L 51/046* (2013.01); *H04L 63/0236* (2013.01); *H04L 63/04* (2013.01); *H04L 63/0428* (2013.01); *H04L 63/08* (2013.01); *H04L 63/0853* (2013.01); *H04L 63/0892* (2013.01); *H04L 63/10* (2013.01); *H04L 63/20* (2013.01); *H04L 67/145* (2013.01); *H04L 67/306* (2013.01); *H04L 67/55* (2022.05); *H04L 67/63* (2022.05); *H04M 15/00* (2013.01); *H04M 15/58* (2013.01); *H04M 15/61* (2013.01); *H04M 15/80* (2013.01); *H04M 15/88* (2013.01); *H04W 4/02* (2013.01); *H04W 4/12* (2013.01); *H04W 4/18* (2013.01); *H04W 4/20* (2013.01); *H04W 4/24* (2013.01); *H04W 4/50* (2018.02); *H04W 8/18* (2013.01); *H04W 8/20* (2013.01); *H04W 12/00* (2013.01); *H04W 12/02* (2013.01); *H04W 12/037* (2021.01); *H04W 12/06* (2013.01); *H04W 12/08* (2013.01); *H04W 12/088* (2021.01); *H04W 24/08* (2013.01); *H04W 28/02* (2013.01); *H04W 28/0215* (2013.01); *H04W 28/0268* (2013.01); *H04W 28/12* (2013.01); *H04W 48/14* (2013.01); *H04W 48/16* (2013.01); *H04W 72/0453* (2013.01); *H04W 88/08* (2013.01); *G06F 2221/2101* (2013.01); *G06F 2221/2115* (2013.01); *G06F 2221/2149* (2013.01); *H04L 41/0876* (2013.01); *H04L 41/5025* (2013.01); *H04L 63/145* (2013.01); *H04L 67/34* (2013.01); *H04L 67/564* (2022.05); *H04M 2215/0188* (2013.01); *H04W 8/02* (2013.01); *H04W 84/04* (2013.01); *H04W 84/042* (2013.01); *H04W 84/12* (2013.01); *H04W 88/06* (2013.01); *Y02P 90/80* (2015.11)

(58) Field of Classification Search
CPC ............... G06Q 30/0284; G06Q 30/04; G06Q 30/0601; G06Q 40/00; G06Q 30/0241;

G06Q 40/12; G06Q 10/06315; G06Q
20/102; H04W 12/0017; H04W 4/24;
H04W 28/02; H04W 12/08; H04W 8/20;
H04W 28/12; H04W 28/0268; H04W
88/08; H04W 24/08; H04W 4/12; H04W
8/18; H04W 72/0453; H04W 28/0215;
H04W 12/06; H04W 48/16; H04W 4/50;
H04L 12/14; H04L 41/0893; H04L
41/5003; H04L 9/32; H04L 67/306; H04L
47/2408; H04L 63/0236; H04L 51/046;
H04L 47/20; H04L 41/0806; H04L
41/5054; H04L 63/0853; H04L 67/327;
H04L 9/3247; H04L 63/0892; H04L
67/145; H04L 67/26; H04M 15/00;
H04M 15/58; H04M 15/88; H04M 15/61;
H04M 15/80; G06F 15/177
USPC .......................................................... 726/1
See application file for complete search history.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,764,693 A | 6/1998 | Taylor et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B1 | 6/2002 | Lazaridis et al. |
| 6,418,147 B1 | 7/2002 | Wiedeman |
| 6,421,722 B1 | 7/2002 | Bauer et al. |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,470,182 B1 | 10/2002 | Nelson |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,556,823 B2 | 4/2003 | Clapton et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,615,034 B1 | 9/2003 | Alloune et al. |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,694,362 B1 | 2/2004 | Secor et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |

(56) References Cited

U.S. PATENT DOCUMENTS

| | | |
|---|---|---|
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,050 B1 | 1/2008 | Musgrave |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |

(56) References Cited

U.S. PATENT DOCUMENTS

| | | |
|---|---|---|
| 7,460,837 B2 | 12/2008 | Diener |
| 7,466,652 B2 | 12/2008 | Lau et al. |
| 7,467,160 B2 | 12/2008 | Mcintyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 | 9/2009 | Lutnick et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,633,909 B1 | 12/2009 | Jones et al. |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,672,695 B1 | 3/2010 | Rainnie et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |

(56) References Cited

U.S. PATENT DOCUMENTS

| | | |
|---|---|---|
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | de Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,310 B2 | 12/2010 | Watt et al. |
| 7,849,477 B2 | 12/2010 | Cristofalo et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,877,090 B2 | 1/2011 | Maes |
| 7,881,199 B2 | 2/2011 | Krstulich |
| 7,881,267 B2 | 2/2011 | Crosswy et al. |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,908,358 B1 | 3/2011 | Prasad et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,962,798 B2 | 6/2011 | Locasto et al. |
| 7,965,983 B1 | 6/2011 | Swan et al. |
| 7,966,405 B2 | 6/2011 | Sundaresan et al. |
| 7,969,950 B2 | 6/2011 | Tyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,064,417 B2 | 11/2011 | Maki |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |

(56) References Cited

U.S. PATENT DOCUMENTS

| | | |
|---|---|---|
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Mng et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B2 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,260,252 B2 | 9/2012 | Agarwal |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,306,518 B1 | 11/2012 | Gailloux |

(56) References Cited

U.S. PATENT DOCUMENTS

| | | |
|---|---|---|
| 8,306,741 B2 | 11/2012 | Tu |
| 8,307,067 B2 | 11/2012 | Ryan |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,346,225 B2 | 1/2013 | Raleigh |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,478,840 B2 | 7/2013 | Skutela et al. |
| 8,483,057 B2 | 7/2013 | Cuervo |
| 8,483,135 B2 | 7/2013 | Cai et al. |
| 8,483,694 B2 | 7/2013 | Lewis et al. |
| 8,484,327 B2 | 7/2013 | Werner et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,207 B2 | 7/2013 | Lee |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 | 9/2013 | Guba et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |

(56) References Cited

U.S. PATENT DOCUMENTS

| | | |
|---|---|---|
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,895 B2 | 12/2013 | Felsher |
| 8,601,125 B2 | 12/2013 | Huang et al. |
| 8,605,691 B2 | 12/2013 | Soomro et al. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,630,630 B2 | 1/2014 | Raleigh |
| 8,630,925 B2 | 1/2014 | Bystrom et al. |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,724,486 B2 | 5/2014 | Seto et al. |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,792,857 B2 | 7/2014 | Cai et al. |
| 8,793,304 B2 | 7/2014 | Lu et al. |
| 8,798,610 B2 | 8/2014 | Prakash et al. |
| 8,799,440 B2 | 8/2014 | Zhou et al. |
| 8,804,695 B2 | 8/2014 | Branam |
| 8,811,338 B2 | 8/2014 | Jin et al. |
| 8,811,991 B2 | 8/2014 | Jain et al. |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tönsing et al. |
| 8,930,238 B2 | 1/2015 | Coffman et al. |
| 8,930,551 B2 | 1/2015 | Pandya et al. |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,014,973 B2 | 4/2015 | Ruckart |
| 9,015,331 B2 | 4/2015 | Lai et al. |
| 9,026,100 B2 | 5/2015 | Castro et al. |
| 9,030,934 B2 | 5/2015 | Shah et al. |
| 9,032,192 B2 | 5/2015 | Frank |
| 9,049,010 B2 | 6/2015 | Jueneman et al. |
| 9,064,275 B1 | 6/2015 | Lu et al. |
| 9,105,031 B2 | 8/2015 | Shen et al. |
| 9,111,088 B2 | 8/2015 | Ghai et al. |
| 9,137,286 B1 | 9/2015 | Yuan |
| 9,172,553 B2 | 10/2015 | Dawes et al. |
| 9,177,455 B2 | 11/2015 | Remer |
| 9,204,282 B2 | 12/2015 | Raleigh |
| 9,282,460 B2 | 3/2016 | Souissi |
| 9,286,469 B2 | 3/2016 | Kraemer et al. |
| 9,286,604 B2 | 3/2016 | Aabye et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,363,285 B2 | 6/2016 | Kitamura |
| 9,367,680 B2 | 6/2016 | Mahaffey et al. |
| 9,413,546 B2 | 8/2016 | Meier et al. |
| 9,418,381 B2 | 8/2016 | Ahuja et al. |
| 9,459,767 B2 | 10/2016 | Cockcroft et al. |
| 9,501,803 B2 | 11/2016 | Bilac et al. |
| 9,544,397 B2 | 1/2017 | Raleigh et al. |
| 9,589,117 B2 | 3/2017 | Ali et al. |
| 9,609,459 B2 | 3/2017 | Raleigh |
| 9,712,476 B2 | 7/2017 | Boynton et al. |
| 9,942,796 B2 | 4/2018 | Raleigh |
| 9,986,413 B2 | 5/2018 | Raleigh |
| 10,021,251 B2 | 7/2018 | Aaron et al. |
| 10,285,025 B1 | 5/2019 | Baker et al. |
| 10,326,800 B2 | 6/2019 | Raleigh et al. |
| 10,492,102 B2 | 11/2019 | Raleigh et al. |
| 10,582,375 B2 | 3/2020 | Raleigh |
| 10,779,177 B2 | 9/2020 | Raleigh |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |

(56) References Cited

U.S. PATENT DOCUMENTS

| | | |
|---|---|---|
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0206533 A1 | 11/2003 | Charas |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0116140 A1 | 6/2004 | Babbar et al. |
| 2004/0123153 A1 | 6/2004 | Wright et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0148237 A1 | 7/2004 | Bittmann et al. |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0101323 A1 | 5/2005 | De Beer |
| 2005/0107091 A1 | 5/2005 | Vannithamby et al. |
| 2005/0108075 A1 | 5/2005 | Douglis et al. |
| 2005/0108534 A1 | 5/2005 | Bajikar et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0144505 A1 | 6/2005 | Takeuchi et al. |
| 2005/0163320 A1 | 7/2005 | Brown et al. |
| 2005/0166043 A1 | 7/2005 | Zhang et al. |
| 2005/0177515 A1 | 8/2005 | Kalavade et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0015749 A1 | 1/2006 | Mittal |
| 2006/0019632 A1 | 1/2006 | Cunningham et al. |
| 2006/0020781 A1 | 1/2006 | Scarlata et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0093107 A1 | 5/2006 | Chien |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0112427 A1 | 5/2006 | Shahbazi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |
| 2006/0183461 A1 | 8/2006 | Pearce |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |

(56) References Cited

U.S. PATENT DOCUMENTS

| | | |
|---|---|---|
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0274706 A1 | 12/2006 | Chen et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0006282 A1 | 1/2007 | Durham et al. |
| 2007/0006289 A1 | 1/2007 | Limont et al. |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0035390 A1 | 2/2007 | Thomas et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061535 A1 | 3/2007 | Xu et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0104169 A1 | 5/2007 | Polson |
| 2007/0109983 A1 | 5/2007 | Shankar et al. |
| 2007/0111740 A1 | 5/2007 | Wandel |
| 2007/0117538 A1 | 5/2007 | Weiser et al. |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0143827 A1 | 6/2007 | Nicodemus et al. |
| 2007/0147317 A1 | 6/2007 | Smith et al. |
| 2007/0147324 A1 | 6/2007 | McGary |
| 2007/0149252 A1 | 6/2007 | Jobs et al. |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0178888 A1 | 8/2007 | Alfano et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0255942 A1 | 11/2007 | Weller et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0288989 A1 | 12/2007 | Aarnos et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0020738 A1 | 1/2008 | Ho et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0046965 A1 | 2/2008 | Wright et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0052395 A1 | 2/2008 | Wright et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0109679 A1 | 5/2008 | Wright et al. |
| 2008/0117958 A1 | 5/2008 | Pattenden et al. |
| 2008/0120129 A1 | 5/2008 | Seubert et al. |
| 2008/0120174 A1 | 5/2008 | Li |
| 2008/0120668 A1 | 5/2008 | Yau |
| 2008/0120688 A1 | 5/2008 | Qiu et al. |
| 2008/0122796 A1 | 5/2008 | Jobs et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0181117 A1 | 7/2008 | Acke et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |

(56) References Cited

U.S. PATENT DOCUMENTS

| | | |
|---|---|---|
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0244018 A1 | 10/2008 | Chen et al. |
| 2008/0250053 A1 | 10/2008 | Aaltonen et al. |
| 2008/0256593 A1 | 10/2008 | Mnberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0291872 A1 | 11/2008 | Henriksson |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0017809 A1 | 1/2009 | Jethi et al. |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0066999 A1 | 3/2009 | Ito |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0077643 A1 | 3/2009 | Schmidt et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0149165 A1 | 6/2009 | Minborg et al. |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217065 A1 | 8/2009 | Araujo, Jr. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254465 A1 | 10/2009 | Oester |
| 2009/0254857 A1 | 10/2009 | Romine et al. |
| 2009/0257379 A1 | 10/2009 | Robinson et al. |
| 2009/0262715 A1 | 10/2009 | Juang |
| 2009/0265754 A1 | 10/2009 | Hinds |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0300450 A1 | 12/2009 | Tzannes |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0041391 A1 | 2/2010 | Spivey et al. |
| 2010/0042675 A1 | 2/2010 | Fujii |
| 2010/0043068 A1 | 2/2010 | Varadhan et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0183132 A1 | 7/2010 | Satyavolu et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |

(56) References Cited

U.S. PATENT DOCUMENTS

| | | |
|---|---|---|
| 2011/0182220 A1 | 7/2011 | Black et al. |
| 2011/0185202 A1 | 7/2011 | Black et al. |
| 2011/0244837 A1 | 10/2011 | Murata et al. |
| 2011/0249668 A1 | 10/2011 | Milligan et al. |
| 2011/0264923 A1 | 10/2011 | Kocher et al. |
| 2011/0277019 A1 | 11/2011 | Pritchard, Jr. |
| 2012/0011017 A1 | 1/2012 | Wolcott et al. |
| 2012/0020296 A1 | 1/2012 | Scherzer et al. |
| 2012/0144025 A1 | 6/2012 | Melander et al. |
| 2012/0166364 A1 | 6/2012 | Ahmad et al. |
| 2012/0196644 A1 | 8/2012 | Scherzer et al. |
| 2012/0238287 A1 | 9/2012 | Scherzer |
| 2013/0029653 A1 | 1/2013 | Baker et al. |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0144789 A1 | 6/2013 | Aaltonen et al. |
| 2013/0225151 A1 | 8/2013 | King et al. |
| 2013/0326356 A9 | 12/2013 | Zheng et al. |
| 2014/0073291 A1 | 3/2014 | Hildner et al. |
| 2014/0241342 A1 | 8/2014 | Constantinof |
| 2015/0181628 A1 | 6/2015 | Haverinen et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1247411 A2 | 10/2002 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| KR | 100958566 B1 | 5/2010 |
| WO | 1998058505 | 12/1998 |
| WO | 1999027723 | 6/1999 |
| WO | 1999065185 A3 | 5/2001 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 03017065 A2 | 2/2003 |
| WO | 2003014891 | 2/2003 |
| WO | 2003017063 A2 | 2/2003 |
| WO | 2003017065 A2 | 2/2003 |
| WO | 2003058880 A1 | 7/2003 |
| WO | 2004028070 A1 | 4/2004 |
| WO | 2004064306 A2 | 7/2004 |
| WO | 2004095753 A3 | 1/2005 |
| WO | 2005008995 | 1/2005 |
| WO | 2005053335 A1 | 6/2005 |
| WO | 2005083934 A1 | 9/2005 |
| WO | 2006004467 A1 | 1/2006 |
| WO | 2006004784 A1 | 1/2006 |
| WO | 2006012610 A2 | 2/2006 |
| WO | 2006050758 A1 | 5/2006 |
| WO | 2006077481 A1 | 7/2006 |
| WO | 2006093961 A1 | 9/2006 |
| WO | 2006120558 | 11/2006 |
| WO | 2006130960 A1 | 12/2006 |
| WO | 2007001833 A2 | 1/2007 |
| WO | 2007014630 A1 | 2/2007 |
| WO | 2007018363 A1 | 2/2007 |
| WO | 2007053848 A1 | 5/2007 |
| WO | 2007068288 | 6/2007 |
| WO | 2007097786 A | 8/2007 |
| WO | 2007107701 A2 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2004077797 A3 | 2/2008 |
| WO | 2008017837 A1 | 2/2008 |
| WO | 2008051379 A2 | 5/2008 |
| WO | 2008066419 A1 | 6/2008 |
| WO | 2008080139 A1 | 7/2008 |
| WO | 2008080430 A1 | 7/2008 |
| WO | 2008099802 A1 | 8/2008 |
| WO | 2009002949 A2 | 12/2008 |
| WO | 2009008817 A1 | 1/2009 |
| WO | 2009002949 A3 | 3/2009 |
| WO | 2006073837 A3 | 4/2009 |
| WO | 2007069245 A3 | 4/2009 |
| WO | 2009091295 A1 | 7/2009 |
| WO | 2010088413 A1 | 8/2010 |
| WO | 2010128391 A2 | 11/2010 |
| WO | 2010128391 A3 | 1/2011 |
| WO | 2011002450 A1 | 1/2011 |

OTHER PUBLICATIONS

"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. Of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.

(56) References Cited

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.
Accuris Networks, "The Business Value of Mobile Data Offload - a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Byrd, "Open Secure Wireless," May 5, 2010.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Droid Wall 1.3.7 description 20100428 obtained from https://www.freewarelovers.com/android/apps/droid-wall.
Ehnert, "Small application to monitor IP trafic on a Blackberry—1.01.03 ", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes In Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Sharkey, "Coding for Life—Battery Life, That Is," May 27, 2009.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.
Arm TrustZone Microprocessor Report, dated Aug. 25, 2033.
Arm TrustZone Paper, TrustZone: Integrated Hardware and Software Security, dated Jul. 2004.
Limont Prosecution History Excerpt, U.S. Appl. No. 11/171,850, filed Jun. 30, 2005.

(56) References Cited

OTHER PUBLICATIONS

Plaintiff's Infringement Contention in Case No. 6:23-CV-00352-JRG-RSP, *Headwater Research LLC v. Cellco Partnership, d/b/a Verizon Wireless, Verizon Corporate Services Group Inc.* (E.D. Tex, filed Jul. 28, 2023).
IPR2024-00809 Petition for Inter Partes Review of U.S. Pat. No. 9,198,042, filed Apr. 19, 2024.
IPR2024-00809 File History of Inter Partes Review of U.S. Pat. No. 9,198,042, filed Apr. 19, 2024.
Declaration and Curriculum Vitae of Dr. Patrick McDaniel.
Complaint, *Headwater Research LLC v. Samsung Electronics Co., Ltd et al*, 2-24-cv-00627, E.D. Tex., filed Aug. 2, 2024.
Excerpts from Smith, et al., 2005. "Virtual Machines: Versatile Platforms for Systems and Processes," Elsevier, Inc, 2005, ISBN 1-55860-910-5.
Declaration of June Munford.
Mallick, M., Mobile and Wireless Design Essentials (2003).
Anderson, R., Security Engineering: A Guide to Building Dependable Distributed Systems. (2001).
Jaeger, T., Operating System Security (Synthesis Lectures on Information Security, Privacy, and Trust) (2008).
Parziale, L., TCP/IP Tutorial and Technical Overview (IBM Redbooks) (2006).
McCanne, S. et al., The BSD Packet Filter: A New Architecture for User-level Packet Capture (1992).
Horak, R., Webster's New World Telecom Dictionary, (2008).
Ganz, A., et al., Multimedia Wireless Networks: Technologies, Standards, and QoS (2003).
Kwok, Y., et al., Wireless Internet and Mobile Computing: Interoperability and Performance (2007).
Brownlee et al., Traffic Flow Measurement: Architecture (1997).
Saltzer, J. H., The Protection of Information in Computer Systems, Proceedings of the IEEE (1975).
Tan, et al., An Empirical Study on the Capacity and Performance of 3G Networks (2008).
Wang, et al., Shield: Vulnerability-Driven Network Filters for Preventing Known Vulnerability Exploits, ACM SIGCOMM Computer Communication Review (2004).
Silberschatz et al., Operating System Concepts (7th ed. 2005).
Cheswick et al., Firewalls and Internet Security (2nd ed. 2003).
Koren et al., Fault Tolerant Systems (2007).
Loscri et al., Voice and Video Telephony Services in Smartphone, EURASIP Journal on Wireless Communications and Networking (2006).
Oxford University Press, A Dictionary of Computing, (6th ed. 2008) (defining "Agent").
Downing et al., Dictionary of Computer and Internet Terms (9th ed. 2006) (defining "Agent").
Kunie et al., "Low power architecture and design techniques for mobile handset LSI Medity M2," 748-753, 2008 Asia and South Pacific Design Automation Conference (2008).
M. Naruse et al., "A 65nm Single-Chip Application and Dual-Mode Baseband Processor with Partial Clock Activation and IP-MMU," 260-612, 2008 IEEE International Solid-State Circuits Conference—Digest of Technical Papers (2008).
Gertz et al., Handbook of Database Security: Applications and Trends, Springer (2007).
Oney, Programming The Microsoft Windows Driver Model (2nd ed. 2003).
Exhibit A, *Headwater Research LLC v. Samsung Electronics Co., Ltd et al*, 2-24-cv-00627, E.D. Tex., filed Aug. 2, 2024.
IEEE 100, The Authoritative Dictionary of IEEE Standards Terms (7th ed. 2000).
Tanenbaum et al., Modern Operating Systems (2001).
The Secure Sockets Layer ("SSL") Protocol, V. 3.0, available at https://web.archive.org/web/19970614041044/http://home.netscape.com/eng/ssl3/ssl-toc.html and https://web.archive.org/web/19970617034012/http://home.netscape.com/eng/ssl3/3-SPEC.HTM#1.
IPR2025-00963 Petition For Inter Partes Review Of U.S. Pat. No. 10,028,144, filed May 5, 2025.
File History of IPR2025-00963 for Inter Partes Review Of U.S. Pat. No. 10,028,144, filed May 5, 2025.
Complaint, *Headwater Research LLC v. Samsung Electronics Co., Ltd. et al*, 2-24-cv-00228, E.D. Tex., filed Apr. 3, 2024.
(Excerpts) Smith, et al., 2005. "Virtual Machines: Versa-tile Platforms for Systems and Processes," Elsevier, Inc, 2005, ISBN 1-55860-910-5.
(Excerpts) Telecom Dictionary, Athos Publishing, 2007.
(Excerpts) Eberspächer, Jörg (2001). GSM Switching, Services and Protocols, Second Edition. John Wiley & Sons Ltd. ISBN: 978-0-470-85394-8.
3rd Generation Partnership Project; Technical Specifica-tion Group Terminals; "Characteristics of the USIM ap-plication" (Release 7), 3GPP TS 31.102 V7.0.0 ("3GPP USIM").
Kasper, et al., Feb. 2008, "Subscriber authentication in cellular networks with trusted virtual sims." In 2008 10th International Conference on Advanced Communication Technology (vol. 2, pp. 903-908). IEEE.
TCG Mobile Reference Architecture, version 1.0, Revi-sion 1, Jun. 12, 2007. ("TCG Mobile Reference Archi-tecture").
TCG Mobile Trusted Module Specification, version 1.0, Revision 6, Jun. 26, 2008. ("TCG Mobile Trusted Mod-ule Specification").
Stone, G.N., Lundy, B. and Xie, G.G., 2001. Network policy languages: a survey and a new approach. IEEE network, 15(1), pp. 10-21.
David K. Gifford. 1982. Cryptographic sealing for infor-mation secrecy and authentication. Commun. ACM 25, 4 (Apr. 1982), 274-286. https://doi.org/10.1145/358468.358493.
Jansen, Wayne A. and Richard P. Ayers. "Forensic Tools for Mobile Phone Subscriber Identity Modules." J. Digit. Forensics Secur. Law 1 (2006): 75-94.
National Institute of Standards and Technology. 2001. Security Requirements for Cryptographic Modules, downloaded from the Internet at https://nvl-pubs.nist.gov/nistpubs/FIPS/NIST.FIPS.140-2.pdf on Dec. 5, 2024.
Verma, et. al., (2002). Policy-based management of con-tent distribution networks. IEEE network, 16(2), 34-39.
Lobo, et. al., (1999). A policy description language. AAAI/IAAI, 1999, 291-298.
Westerinen, et al., IETF RFC 3198, Terminology for Pol-icy-Based Management, Nov. 2001, downloaded from the Internet on May 27, 2024.
(Excerpts) Keith Mayes and Konstantinos Markantona-kis. 2008. Smart Cards, Tokens, Security and Applica-tions (1st. ed.).
(Excerpts) Gasser, Morrie. Building a Secure Computer System. New York, NY: Van Nostrand Reinhold, 1988. ("Gasser").
(Excerpts) Malhotra, Ravi. 2002. IP Routing: Help for Network Administrators. O'Reilly Media. ISBN: 978-0-596-00275-0 ("Malhotra").
Jude, Michael. "Policy-Based Management: Beyond the Hype." Business Communications Review 31.3 (2001): 52-56. ("Jude").
Merkle, Ralph C. 1978. Secure communications over in-secure channels. Commun. ACM 21, 4 (Apr. 1978), 294-299. https://doi.org/10.1145/359460.359473 ("Merkle").
ARM. 2004. PrimeCell Infrastructure AMBA 3 TrustZone Protection Controller (BP147) Revision: r0p0 Technical Overview, downloaded from the Internet at https://documentation-ser-vice.arm.com/static/5e9565afc8052b1608762aae%3Fto-ken%3D&ved=2ahUKEwiZq56_3pGKAxVUCnkGHcR9OGIQFnoECAwQAQ&usg=AOv-Vaw2PG8jUG9TU8fpiRxmGKNyM on Dec. 5, 2024.
Network Associates, Inc. 1999. PGP, Version 6.5.1. An Introduction to Cryptography.
Stuart E. Madnick and John J. Donovan. 1973. Applica-tion and analysis of the virtual machine approach to in-formation system security and isolation. In Proceedings of the workshop on virtual computer systems. Associa-tion for Computing Machinery, New York, NY, USA, 210-224. https://doi.org/10.1145/800122.803961.
European Telecommunications Standards Institute. 1998. Terrestrial Trunked Radio (TETRA); Security Aspects; Subscriber Identity Module to Mobile Equipment (SIM-ME) interface. ETSI ETS 300 812 ed.1 (Nov. 1998), down-loaded from the Internet at https://

(56) References Cited

OTHER PUBLICATIONS www.etsi.org/de-liver/etsi_i_ets/300800_300899/300812/01_20_9826/ets_300812e01c.pdf on Dec. 12, 2024.

IETF RFC 1122, Requirements for Internet Hosts—Communication Layers, Oct. 1989, downloaded from the internet at https://datatracker.ietf.org/doc/html/rfc1122 on Dec. 12, 2024.

IETF RFC 793, Transmission Control Protocol, Sep. 1981, downloaded from the internet at https://www.ietf.org/rfc/rfc793.txt on Dec. 11, 2024.

Smith, et al., 2005. "The architecture of virtual machines. Computer," 38(5).

ISO/IEC 7498-1, "Information technology—Open Systems Interconnection—Basic Reference Model: The Basic Model," downloaded from the internet at https://www.ecma-international.org/wp-content/up-loads/s020269e.pdf on Jan. 10, 2025.

Gonçalves, et al., Oct. 2009, A graphical user inter-face for policy composition in CIM-SPL. In 2009 Inter-national Conference on Ultra Modern Telecommunications & Workshops (pp. 1-7). IEEE.

Agrawal, et. al., May 2007, Issues in designing a policy language for distributed management of IT infrastruc-tures. In 2007 10th IFIP/IEEE International Symposium on Integrated Network Management (pp. 30-39). IEEE.

File History of IPR2025-00482, filed Jan. 28, 2025.

Petition for Inter Partes Review in IPR2025-00482, filed Jan. 28, 2025.

SECURITY TECHNIQUES FOR DEVICE ASSISTED SERVICES

BACKGROUND OF THE INVENTION

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRA WINGS

Various embodiments of the invention are disclosed in the following detailed description and the accompanying drawings.

DETAILED DESCRIPTION

Figure 1:
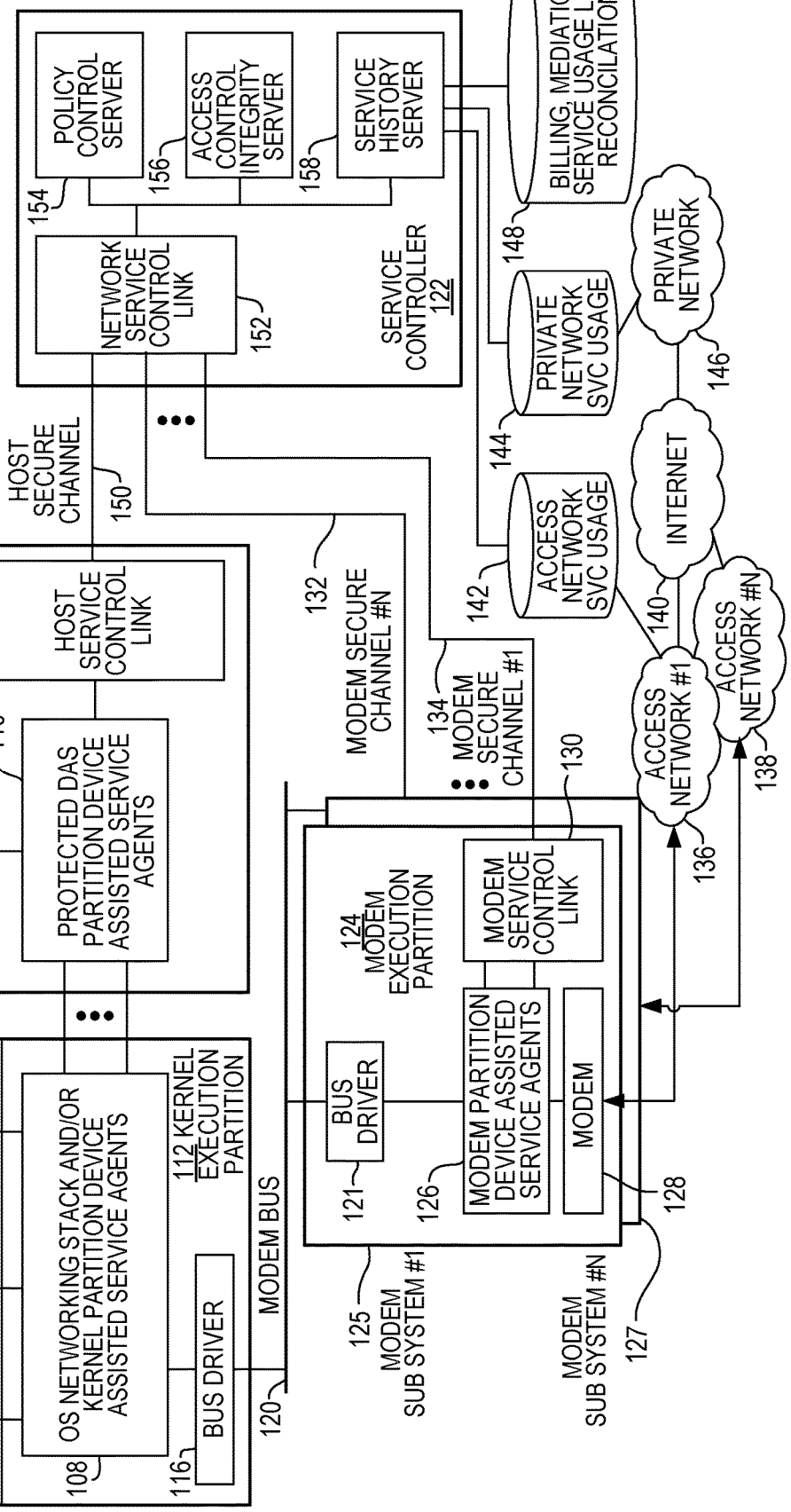
FIG. 1 illustrates a secure execution environment for device assisted services in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, security techniques for device assisted services are provided. In some embodiments, secure service measurement and/or control execution partition techniques for device assisted services are provided. In some embodiments, a secure execution environment for device assisted services is provided. In some embodiments, a secure stack for device assisted services is provided. In some embodiments, a secure memory for device assisted services is provided. In some embodiments, a secure modem for device assisted services is provided (e.g., providing a secure communication link between the modem/modem driver and a service processor and/or agent on the device, such as a communications device or an intermediate networking device). In some embodiments, one or more secure monitoring points for device assisted services are provided. In some embodiments, one or more secure monitoring points with verification for device assisted services are provided (e.g., a secured monitoring point can be provided in a modem, which communicates securely to a secured execution environment in a CPU/processor, which can then verify such service usage measures). In some embodiments, a secure bus for device assisted services is provided. In some embodiments, a secure execution environment in the CPU/processor for device assisted services is provided. In some embodiments, secure access to a secure execution environment(s) for device assisted services is provided (e.g., securing communication from a bottom of the stack, such as modem drivers, which require credentials to access the bus as controlled by a service processor or secure agent on the device, and in which the traffic on the bus is encrypted). In some embodiments, various secure execution environments for device assisted services are provided using various hardware partition techniques (e.g., secure memory, secure modems, secure memory partition(s) in the CPU/processor), as described herein.

In some embodiments, device assisted services (DAS) provide for one or more of device based service usage measurements, service usage policy implementation, service usage accounting, service usage control, and any of the other functions described in various embodiments that assist, replace, and/or augment network based functions. For example, various DAS embodiments perform one or more of the following: facilitate and control activation to one or more access service networks; measure access and/or service usage on one or more access networks; control access and/or service usage on one or more access networks; account for different types of service usage on one or more access networks; implement quality of service (QOS) controls, collect and report QOS traffic demand, aggregate multiple device QOS demand reports to asses a measure of overall network QOS demand, and/or facilitate QOS resource allocation; and/or facilitate roaming between access networks. There are many more functions and embodiments for DAS as described with respect to various embodiments.

In some embodiments, various program/functional elements that perform the functions to implement various DAS embodiments are referred to herein as DAS agents or device assisted service agents, or in some embodiments, more specific terms are used to be more descriptive in specific examples. In some embodiments, device assisted service agent functions include service measurements and/or service measure recording and/or service measure reporting (e.g., to the service controller, the device, the user, or other device agents) and/or service measure synchronization (e.g., between device and network). In some embodiments, device assisted service agent functions include service usage controls and/or service usage control policy settings. In some embodiments, service usage controls include one or more of network authorization, network authentication, network admission, access control, service usage activity classification, allowing or disallowing one or more service usage activity and traffic shaping for one or more service usage activity.

In some embodiments, device assisted service agent functions include one or more of the following: reporting service usage to QOS control elements in the network, receiving QOS assignment from the network, reporting QOS assignments to the network, and/or communicating with QOS service reservation elements in the network. In some embodiments, device assisted service agent functions include one or more of implementing QOS service controls on the device based on one or more of the following criteria: fair queuing of service usage activities, differentiated QOS based on an assigned QOS hierarchy of service usage activities, service usage activity QOS assignments from the network for one or more service usage activities, service usage activity policy directives from the network for one or more service usage activities.

In some embodiments, a service control link is used for communication between the device assisted service agents and the service controller. In some embodiments, the service control link is a secure link (e.g., an encrypted communication link).

In some embodiments, the device assisted service agent functions include device assisted service system communication, measuring and/or recording and/or reporting and/or synchronizing service measures, observing communicating information for service control integrity, communicating information for service control policy instructions and/or settings, or updating device assisted software and/or agent settings.

In some embodiments, device assisted service on the device includes the following: service measurements, service controls, user interface and usage reporting, user policy options, accept policy instructions, protected execution partition provided to prevent hacking, malware, errors, and other security techniques. In some embodiments, device assisted service on the server includes one or more of the following: set policy, set configurations, install/update agents, check usage versus policy, check proper operation of agents, synchronize usage from network to device, and other verification techniques. For example, when errors in policy enforcement are detected, servers can perform actions to either further observe, quarantine, or suspend the device.

In some embodiments, a control server/control service network element receives service measures from the device. In some embodiments, the control server/control service network element receives service measures from the network. In some embodiments, the control server/control service network element sets policies and manages service across multiple networks (e.g., while one modem is shown in various figures, multiple modems can be employed for multiple networks with consistent service usage measures, service controls, QOS controls, UI (User Interface), user preferences, user usage reporting, and/or other settings/controls across different networks).

In some embodiments, traffic type refers to one or more of the following: best effort network traffic, real-time traffic (e.g., live voice such as VOIP, live video, etc.), streaming traffic, multi-cast traffic, uni-cast traffic, point to point traffic, file types, traffic associated with an application, real time traffic, traffic with an assigned priority, traffic without an assigned priority, and traffic for a certain network.

In some embodiments, service usage activity refers to a usage of service by a device. In some embodiments, service usage activity can be one or more of connection to an access network, connection to certain destinations, URLs or addresses on a network, connection to the network by one or more applications, transmission of certain types of traffic, a type of transaction based service, a type of advertising based services, or a combination of one or more of the following: an application type, a network destination/address/URL, a traffic type, and a transaction type.

In some embodiments, protection of the device assisted service agents/functional elements to protect the functions that perform the device assisted functions is provided with a protected execution partition on the CPU (Central Processor Unit), APU (Auxiliary Processor Unit), or another hardware based processor. For example, such hardware protected execution capabilities in the CPU, APU, or other processor can be combined in some embodiments with either OS software functions or other native mode software functions to create secure program execution partitions as described herein. In some embodiments, the term host is used to refer to the hardware and firmware and/or software system that executes the device applications and networking stack. In some embodiments, some of the device assisted service agents/functions are implemented in a modem execution partition environment.

FIG. 1 illustrates a secure execution environment 100 (e.g., for a communications device) for device assisted services in accordance with some embodiments. As shown in FIG. 1, the device execution environments include program/functional elements for a communications (e.g., a communications device can be an intermediate networking device, such as 3G/4G WWAN to WLAN bridges/routers/gateways, femto cells, DOCSIS modems, DSL modems, remote access/backup routers, and other intermediate network devices, or a mobile communications device, such as a mobile phone, a PDA, an eBook reader, a music device, an entertainment/gaming device, a computer, laptop, a netbook, a tablet, a home networking system, and/or any other mobile communications device) device that utilizes the modem subsystems #1 (125) through #N (127) to connect to one or more of the access networks #1 (136) through #N (138). In some embodiments, a communications device includes multiple program execution partitions. As shown in FIG. 1, four execution partitions are provided: an application execution partition 102 in which, for example, application programs execute, a kernel execution partition 112 in which, for example, the lower level drivers and basic low level OS programs execute, a protected device assisted service (DAS) execution partition 114 (also referred to as protected DAS partition) in which, in some embodiments, some or all of the device assisted service agents and/or functions execute, and a modem execution partition 124 in which, for example, the modem program elements execute and, in some embodiments, some or all of the device assisted service agents and/or functions execute. In some embodiments, each of these execution partitions are optimized for different software functions, each providing programs with the basic physical memory, data memory, CPU or APU or modem processor execution resources, high level and/or low level OS, memory management, file storage, I/O device resources (e.g., user interface (UI), peripherals, etc.), network communications stack, other device resources, and/or other resources that are required or used for operation of the programs. The collection of these hardware and software resources for the CPU or APU is sometimes referred to herein with the term host.

As shown, FIG. 1 illustrates an application execution partition 102 and a kernel execution partition 112, which are shown as separate partitions within the device execution environments. For example, this separation is based on the manner in which "kernel programs" (e.g., drivers and network stack, etc.) are commonly supported as compared to "application programs" (e.g., browsers, word processors, user interfaces, etc.) within the context of several different popular operating systems (OS) (e.g., Windows, UNIX, Linux, MAC OS, certain mobile device OSs, certain embedded device OSs, etc.). In some embodiments, this functional separation is not required, and, in some embodiments, other functional separations are supported.

As shown in FIG. 1, protected device assisted service agents, such as the protected DAS partition device assisted service agents 110, execute in the protected DAS partition 114 while unprotected device assisted service agents and/or OS networking stack elements and applications (e.g., applications 106A through 106C) execute outside of the secure device assisted service execution partition 114, such as the application partition device assisted service agents 104 and the OS networking stack and/or kernel partition device assisted service agents 108. For example, the protected DAS partition 114 can make it more difficult for a hacker, malware or system errors to compromise, attack or modify the device assisted service measurements, service policy implementation or service usage control operations on the device (e.g., communications device). In some embodiments, the protected DAS partition 114 need not support open access to all programs and OS elements so that it can be easier to protect. Also, as shown, a bus driver 116 in the application execution partition 102 provides for communication with a modem bus 120, which is in communication with a bus driver 121 in the modem execution partition 124. The protected DAS partition also includes a host service control link 118, which facilitates communication with a host secure channel 150 as shown.

In some embodiments, the protected DAS partition 114 is a protected execution partition on the main device that is supported by certain configurations in the host (e.g., a secure virtual execution environment or a separate hardware security function). For example, this protected execution partition can be used to provide added service measurement integrity and/or service control integrity for a device assisted service enabled device. In some embodiments, as described herein, the operating system (OS) also performs a role in establishing the protected execution partition for secure operation of device assisted services, and, in some embodiments, this role is performed by native software or firmware operating on secure hardware elements.

In some embodiments, the DAS agents responsible for maintaining service control integrity execute in the protected DAS partition 114. For example, the protected DAS partition device assisted service agents 110 can include one or more of the following: one or more service usage measurement functions; some or all of the device networking stack functions that are monitored and/or controlled by the device assisted services system; device drivers that interface to an OS networking stack to observe or manipulate stack traffic; access control integrity functions; service policy control functions; service UI functions; application identification functions, and/or functions to classify service usage activities by combinations of application, address/URL and/or traffic type; modem bus driver functions; and/or modem data encryption functions to prevent other unauthorized programs from bypassing the device assisted service measurements and/or controls by directly accessing the modem around the stack. In some embodiments, the system designer or a given set of design criteria determine which of the various described device assisted agent functions should be executed in protected DAS partition 114 to strengthen the service control integrity for the system.

In some embodiments, the device operating system provides for the protected DAS partition 114 in addition to conventional security features available in the operating system. In some embodiments, the protected DAS partition 114 provides an execution partition with increased program execution protection in which, for example, service measurement and/or service control programs (agents) can execute in a mode that provides for higher access control integrity (e.g., proper service usage reporting and/or service measurement and/or service control system operation with increased protection from attacks, errors, malware, etc.). In some embodiments, a hardware assisted secure execution partition provides for increased program execution protection for device assisted service agent functions.

In some embodiments, a service control link (e.g., host service control link 118 via host secure channel 150 to network service control link 152) is used for communication between the device assisted service agents and a service controller 122. In some embodiments, the service control link is a secure link (e.g., an encrypted communications link). In some embodiments, an encrypted secure control link can be implemented over the higher layers of the network stack (e.g., TCP, HTTP, TLS, etc.), and, in some embodiments, the encrypted link can be implemented over lower layers in the network stack, such as the IP layer or the access network layers (e.g., the WWAN device management channels or signaling layers). In some embodiments, service control link security is provided at least in part by encrypting link traffic between the device and the service controller 122. In some embodiments, service control link security is provided at least in part by running the service control link device side program agents in the protected DAS partition 114. In some embodiments, service control link security is achieved at least in part by restricting access to the service control link to certain device assisted service agents that are allowed to communicate with the service controller 122. In some embodiments, the agents that are allowed to communicate with the service control link perform such communications using encrypted communications. In some embodiments, the encrypted communications is accomplished with a secure inter-agent communication bus on the device. In some embodiments, the only mechanism for modifying the configuration of the operation, execution code, execution instructions and/or settings of certain device assisted service processor agents executing in the protected DAS partition 114 is through the service control link. In some embodiments, the only mechanism for modifying any program elements executing inside the protected DAS partition 114 is through the service control link so that only the service controller 122 may modify the operation or service policy settings for the agents located in the service measurement and/or service control execution partition.

As shown in FIG. 1, various server functions within the service controller 122 are provided. In some embodiments, a service history server 158 collects service usage measures from one or more of the device DAS agents and/or from various sources of potential network based service usage databases, such as the access network service usage 142 (e.g., carrier charging data record (CDR) systems), private network service usage 144 (e.g., MVNO or enterprise network service usage accounting system), and/or billing, mediation service usage log, reconciliation 148 (e.g., service provider billing or mediation system). In some embodiments, an access control integrity server 156 is used to compare various access control verification checks to ensure that the device assisted service agents have not been compromised. The various embodiments used in the access control integrity server 156 to perform these integrity checks are described with respect to various embodiments. Some embodiments include comparing device based service usage measures versus the service usage that should result if the desired service policy were properly implemented, comparing device based service usage measures versus the service usage that should result if the desired service policy were properly implemented with device based service usage measures that are executing in the protected DAS partition 114 and/or the modem execution partition 124, comparing network based service usage measures versus the service usage that should result if the desired service policy were properly implemented, and comparing network based service usage measures with device based service usage measures. In some embodiments, a policy control server 154 stores policy settings for the various service plans that can be implemented on the device, and communicates the appropriate policy settings to the appropriate device DAS agents.

In some embodiments, the service controller 122 has secure access to service measures, service control settings, software images, software security state(s), and/or other settings/functions, for example, by virtue of the hardware enhanced execution partition and the secure channel into the protected DAS partition 114. For example, the host secure channel 150 can be encrypted employing keys that are public/private or point to point private. Also, other link security, for example, can be implemented as described herein. For example, servers can ensure that the link remains authenticated and information is validated. For example, the service controller can perform one or more of the following verification techniques: compare the monitored service usage versus the policy, compare the monitored service usage versus other service usage measures and/or combined with various other network service usage measures.

In some embodiments, the protected DAS partition 114 includes a host service control link 118 as shown in FIG. 1 that works in combination, that is, in communication with a network service control link 152 to send and receive secure messages between the service controller and the host via a host secure channel 150. In some embodiments, the protected DAS partition 114 only accepts new program images from the service controller 122 and not from local programs or disks. In some embodiments, the protected DAS partition 114 cannot communicate with other applications and/or kernel programs. In some embodiments, the protected DAS partition 114 can also communicate with other applications and/or kernel programs but only to gather information or to set settings. In some embodiments, the protected DAS partition 114 can also communicate with other applications and/or kernel programs but only through a restricted encrypted communication bus that restricts outside program access to protected programs or agent functions, and can also restrict the agents inside of the protected partition from accepting unauthorized information or code modifications from programs outside the protected partition. Various other security techniques can be provided for the DAS execution environments as will be apparent to one of ordinary skill in the art in view of the embodiments described herein.

In some embodiments, the protected DAS partition 114 is created by employing CPU or APU hardware security features in addition to or in alternative to other software security features (e.g., virtual execution partitions) that can be provided by the operating system and/or other software. In some embodiments, the host hardware security features are provided with the operating system secure kernel operating modes. In some embodiments, the host hardware security features used for secure device assisted service execution partition operation are independent of the operating system kernel (e.g., implemented in secure program partitions in a separate secure program area not directly controlled by the OS and/or software that does not have access to the partitions).

In some embodiments, the hardware security features that support the protected DAS partition 114 include preventing other elements on the device from writing and/or reading certain memory areas reserved for device assisted service agents and/or control link functions. In some embodiments, this memory protection function is accomplished by locating the memory in a secure hardware partition that cannot be accessed by unauthorized device program elements (e.g., a separate bank of isolated memory space within the host CPU). In some embodiments, this memory protection function includes encrypting traffic to and from memory so that only authorized device program elements posses the counterpart encryption capability to access the memory. In some embodiments, the mechanism to access device assisted service agent memory and/or certain data elements is restricted to authorized device assisted service agents and/or the service controller via the service control link so that unauthorized program elements on the device cannot alter the device assisted service agent code and/or operation.

In some embodiments, the hardware security features that support the protected DAS partition 114 includes preventing unauthorized elements on the device from accessing the protected storage and/or file storage (e.g., "protected storage," such as disk storage, non-volatile memory, embedded non-volatile memory, such as NVRAM, flash or NVROM, securely embedded non-volatile memory, and/or other types of storage) that is used to store the device assisted service agent programs. In some embodiments, this protected storage is maintained within the secure hardware partitions that also execute one or more of the device assisted service agents so that only authorized device assisted service agents have access to the storage locations. In some embodiments, the images that are stored in such protected file storage must be properly encrypted and signed for a boot loader to authorize loading the device assisted service agent programs into execution memory, and in some embodiments, if the images are not properly signed then an access control integrity error is generated and/or the program is not loaded. In some embodiments, such properly signed DAS images can only be obtained from the service controller. In some embodiments, such DAS images can only be loaded into protected file storage by the service controller. In some embodiments, the hardware security features that prevent unauthorized elements on the device from accessing the protected file storage include encrypting all traffic to and from the secure storage so that only authorized device program elements possess the counterpart encryption capability to access the storage. In some embodiments, access or access rights to re-program a device assisted service agent program store is restricted to the service controller via the service control link so that unauthorized program elements on the device are not authorized to alter the device assisted service agent code and/or operation.

In some embodiments, the hardware security features that protect device assisted service agent storage include a protected DAS partition in which an access control integrity agent function is isolated from other device program elements, and a secure service control link is also isolated in a similar manner, and the access control integrity agent scans the execution memory, data memory and/or file storage used by one or more device assisted services agents to measure and/or control services. In some embodiments, the purpose of the scan is to detect changes to the device assisted service agent code and/or data. In some embodiments, the purpose of the scan is to detect other unauthorized program elements or data that may be present in reserved or protected areas used for device assisted service agent execution. In some embodiments, reports of such scan audits are reported over the service control link to the service controller for further processing by use of cloud based resources to identify access control integrity violations. In some embodiments, the access control integrity agent functions include one or more of hashing other device assisted security agents, querying other device assisted security agents, observing the operation of other device assisted security agents or monitoring service measures and then either evaluating the results locally on the device to determine if they are within pre-defined allowable parameters or sending at least some of the results to the service controller for further analysis via the service control link. In some embodiments, the scan audits are compared with earlier versions of the scans to compare code configuration or operational characteristics. In some embodiments, the scan audits are compared against known databases for the code or operational characteristics that should be present in the DAS agents.

In some embodiments, an access control integrity agent, or a new version of the access control integrity agent can be downloaded by the service controller over the secure service control link. For example, this technique provides for a real time assessment of device service control security state as described above in the event that corruption or compromise of the secure device assisted service agent(s) has occurred. In some embodiments, the access control integrity agent that is downloaded can have a different configuration and/or operation than any agent previously loaded onto the device so that it is difficult or impossible for a hacker or malware to spoof the operation of the agent in a short period of time. For example, by requiring the agent to report security assessments back to the server in a period of time that is typically less than what is required to spoof the agent, the agent will either report back an accurate assessment of device status or will be blocked by a hacker or malware, and both of these conditions can provide the information required to take action if the device assisted services system has been corrupted or compromised.

In some embodiments, the protected DAS partition and/or the modem execution partition can be used to securely store some or all of the device credentials that are used for one or more of device group association, activation, authorization to the access network and/or the DAS network, service level, and service usage accounting and/or billing.

In some embodiments, the modem subsystem also includes DAS elements that strengthen the access control integrity of the DAS system. As shown in FIG. 1, one or more modems can include, in some embodiments, DAS agent functions labeled modem partition DAS agents 126. The modem execution partition 124 of the modem sub system #1 (125) of the modem execution partition 124 includes modem partition DAS agents 126 in communication (e.g., secure communication, such as using encrypted communications) with a modem 128 and a modem service control link 130, which is in communication with the network service control link 152 via the modem secure channel #1 (132), as shown. Also, the modem 128 is in communication (e.g., secure communication, such as using encrypted communications) with the access network #1 (136), which is in communication with the access network service usage 142 and the Internet 140, which is in communication with a private network 146, which is in communication with the private network service usage 144, as shown.

Example embodiments for DAS agent functions that execute in the modem execution partition include modem encryption and modem service usage measures. In other embodiments, the modem execution partition can also include higher level DAS agent functions, such as stack traffic classification, stack manipulation, access control, and/or traffic control. For example, the modem execution partition can also include a full service processor that is fully capable of managing all aspects of service usage measurement and/or service control. It will now be apparent to one of ordinary skill in the art that the modem execution partition can employ a number of the service security embodiments described in the context of the protected DAS partition, for example, to enhance the service integrity of the DAS system. For example, the DAS agents on the modem can be stored in an encrypted and signed format on non-volatile (NV) memory on the modem that is only accessible by the network service control link or by a local secure control link from the protected DAS partition to the modem execution partition. As shown in FIG. 1, a separate secure modem control channel (e.g., modem secure channel #1 (132) through modem secure channel #N (134)) that is distinct from the host secure control channel 150 is provided. This separate modem control channel can either be implemented over the higher network layers of the device or over the lower access network layer so that special access to access network resources is required to even connect to the modem DAS agents 126 thereby further enhancing service control related security.

In some embodiments, the protected DAS partition provides for performing the DAS agent functions required for parental controls, enterprise WWAN management controls or roaming controls, and/or usage reporting in the protected execution space. In view of the DAS embodiments described herein, it will now be apparent to one of ordinary skill in the art how to implement such protected controls for these various and other application scenarios.

In some embodiments, a protected DAS partition provides for performing a virtual machine (VM) on top of a secure machine. The device application OS that is accessible by software that can be installed without special permissions can be isolated from the secure hardware and/or OS that is running under the VM. Using these techniques, malware can be "cocooned in" on the VM OS rather than "walled out" as discussed with respect to various embodiments described herein.

In some embodiments, communication between program/functional elements outside of the protected DAS partition to DAS agents inside the protected DAS partition is controlled by a secure encrypted channel. In some embodiments, only programs/functions that have access to communicate with DAS agents are allowed to do so, and, in some embodiments, even these outside programs are not allowed to modify the DAS agent configuration, only to report information and/or receive information.

For example, various embodiments can be used to connect to multiple access networks through multiple modems, with each modem potentially being associated with a different set of DAS service policies corresponding to the different types of access networks supported. In some embodiments, such as for 3G/4G modems, WWAN/WLAN modems, and various other multiple modem embodiments, the multiple modems can also be provided on the same multi-mode modem subsystem rather than on different modem subsystems.

In some embodiments, the various techniques and embodiments described herein can be readily applied to intermediate networking devices as will now be apparent to one of ordinary skill in the art. For example, an intermediate networking device can includes some or all of the DAS agents for managing, controlling, and/or measuring service usage for one or more devices in communication with a wireless network via the intermediate networking device, in which the DAS agents can be executed in secure execution environments or secure execution partitions using the various techniques described herein. In some embodiments, intermediate networking devices include, for example, WWAN/WLAN bridges, routers and gateways, cell phones with WWAN/WLAN or WWAN/Bluetooth, WWAN/LAN or WWAN/WPAN capabilities, femto cells, back up cards for wired access routers, and other forms/types of intermediate networking devices.

Figure 2:
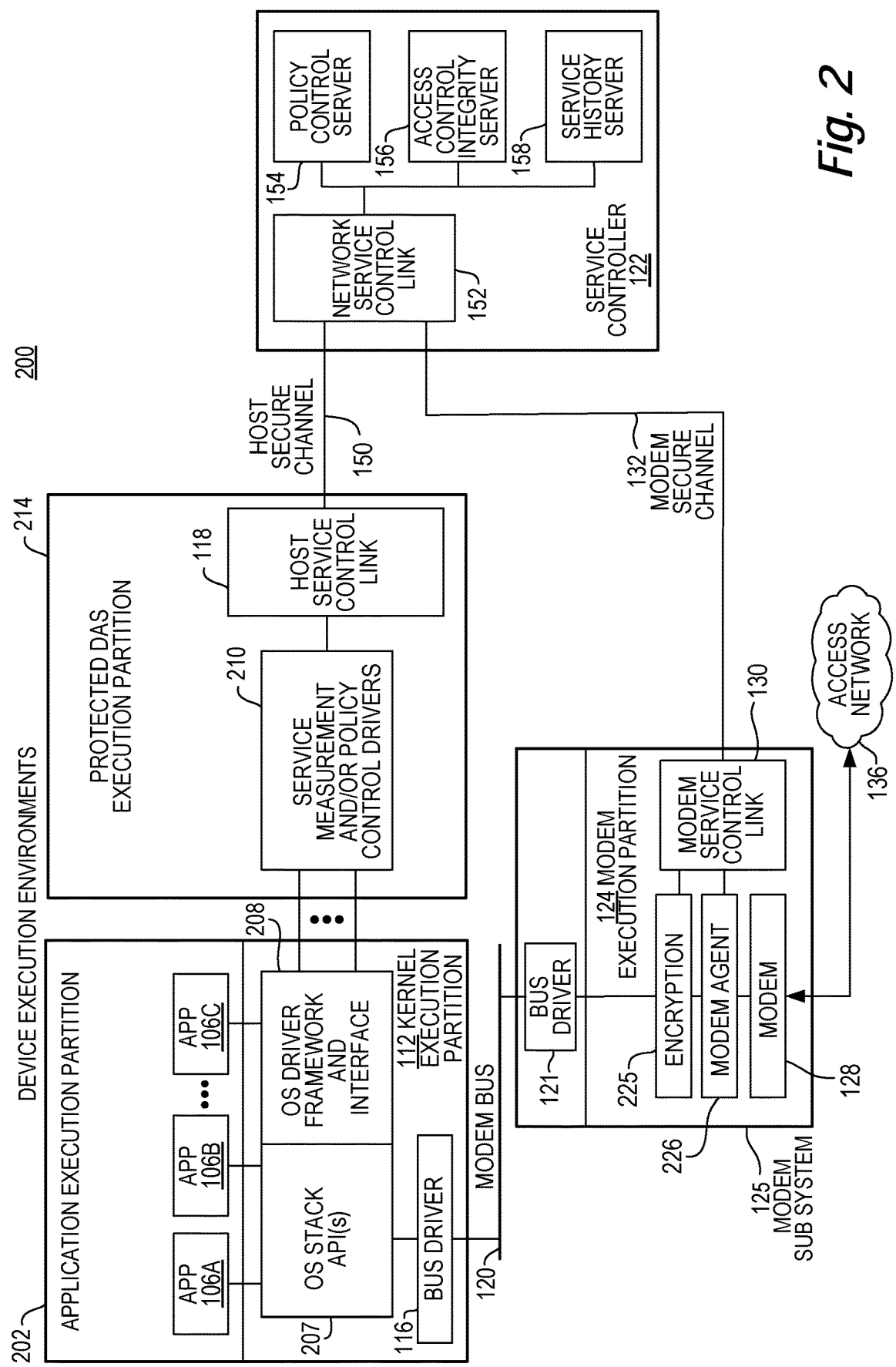
FIG. 2 illustrates another secure execution environment for device assisted services in accordance with some embodiments.

FIG. 2 illustrates another secure execution environment 200 for device assisted services in accordance with some embodiments. In particular, FIG. 2 illustrates an embodiment in which DAS agents do not actually replace the OS network stack elements, but instead one or more DAS agents include device driver programs that interface into the network stack and pass (e.g., securely communicate) traffic information or actual traffic back and forth with the stack. These device driver interface constructs are labeled OS driver framework and interface 208 as shown in FIG. 2. Example OS system constructs that provide for this type of architecture for DAS agents include Windows NDIS and/or TDI drivers, Windows Filter Platform (WFP), Berkeley Packet Filter, ipfw (e.g., a BSD packet filter that can be used for various OSs, such as Unix, Linux, MAC OS), and/or other platforms/programs performing these or similar functions. While these OS stack options are not secure in themselves, if the drivers that interface with them are secured as illustrated in FIG. 2 by executing the drivers in the protected DAS partition 214, then higher overall access control integrity/security levels can be achieved.

As shown in FIG. 2, the service measurement and/or policy control drivers 210 executed in the protected DAS partition 214 represent the DAS drivers that interface to the OS stack device driver interface constructs labeled OS driver framework and interface 208 executed in the kernel execution partition 212, which are in communication with/interface with OS Stack API(s) 207. As also shown, applications, such as applications 106A through 106C execute in the application execution partition 202. In some embodiments, service access control integrity is further enhanced by placing additional measurement points outside of the network stack, so that, for example, if the network stack service usage reporting is hacked, corrupted, and/or compromised, there is a secure additional or back-up service measure located on the device and/or in the network (e.g., modem agent 226 as shown in FIG. 2, which provides a service measurement point in the modem for measuring service usage by the device, and as shown also provides for secure communication with the modem agent 226 using modem encryption 225). For example, the service measure provided by the modem agent 226, modem encryption 225, and/or modem bus 120 functions shown in FIG. 2 can be executed in a protected partition (e.g., modem execution partition 124 as shown in FIG. 2 can be implemented as a secure or protected partition using the various techniques described herein).

Figure 3:
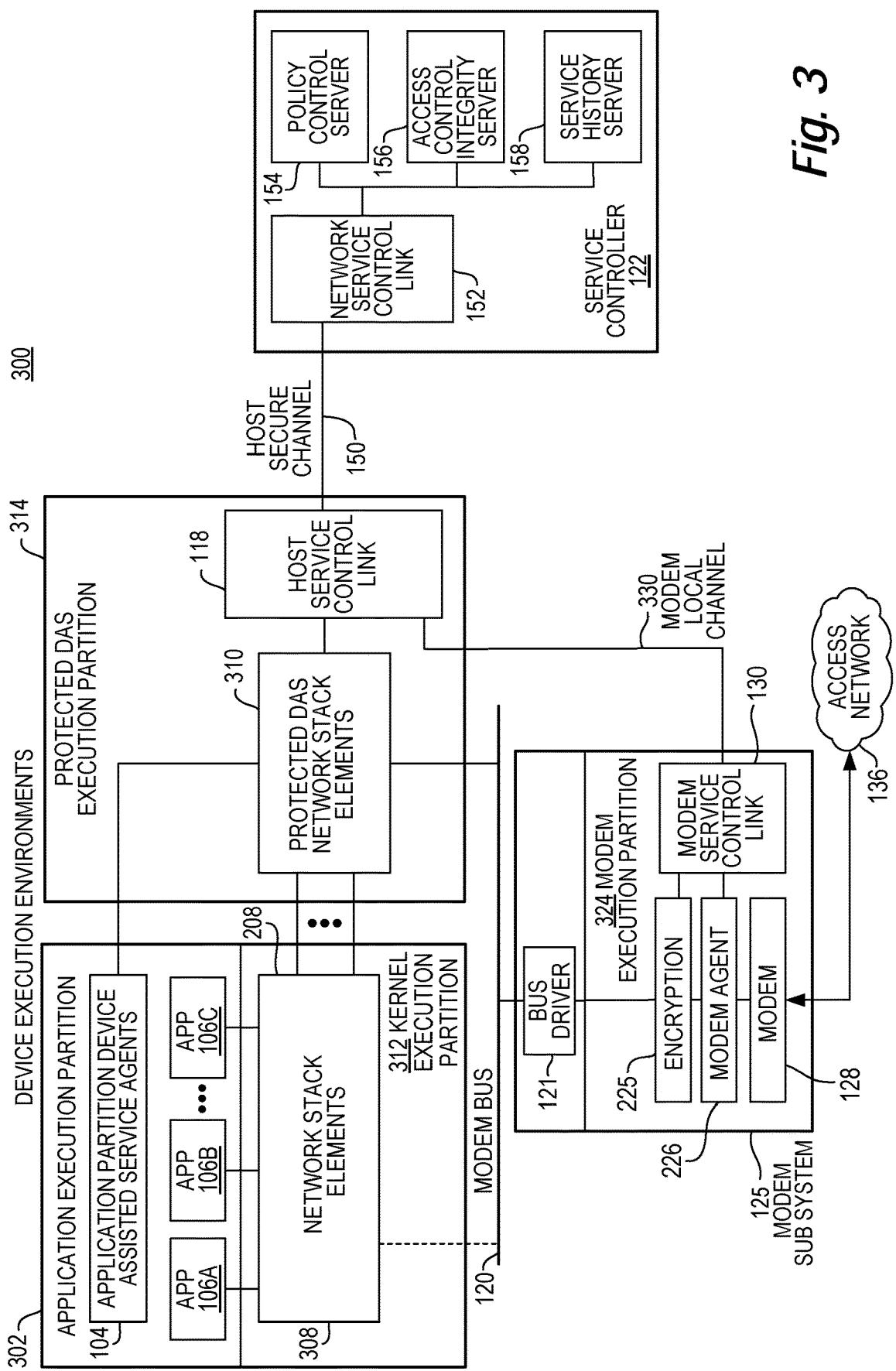
FIG. 3 illustrates another secure execution environment for device assisted services in accordance with some embodiments.

FIG. 3 illustrates another secure execution environment 300 for device assisted services in accordance with some embodiments. As shown, some stack elements are executed in the kernel execution partition 312 and some stack elements are executed in the protected DAS execution partition 314. In some embodiments, the DAS agents 104 executed in the application execution partition 302 are directly monitoring and/or controlling stack traffic by intercepting it and imposing additional traffic measurement and/or filtering. Examples of such techniques are described herein with respect to various embodiments. As shown in FIG. 3, the network stack elements 308 are the OS stack elements that reside in the kernel execution partition 312 and the protected DAS network stack elements 310 are the stack elements that reside in protected DAS execution partition 314. For example, as some or potentially all of the stack network traffic processing resides in the protected DAS execution partition 314, a high level of service control integrity can be maintained using these techniques. For example, the modem bus driver 121 can be executed in a secure execution partition, such as modem execution partition 324, which can be implemented as a secure execution partition using the various techniques described herein, or the modem bus driver 121 can be executed in the protected DAS execution partition 314, so that unauthorized programs can be blocked from accessing the access network through the modem.

In some embodiments, the entire stack is executed in the protected DAS execution partition 314 with only a stack API executing in kernel execution partition 312. Various other embodiments involve implementing a minimum (e.g., in terms of a number of agents and/or functionality) in the protected DAS execution partition 314 required to secure a service measure that can be used to confirm the integrity of the service policy implementation (e.g., as described with respect to various other embodiments disclosed herein). As will now be apparent to one of ordinary skill in the art, various combinations of stack processing functions can be implemented in a secure host execution partition to strengthen the service measurement and/or service control integrity of the DAS system using the techniques and/or similar techniques to the various techniques described herein.

In some embodiments, the stack elements implemented in the protected DAS execution partition can include stack API, sockets layer, TCP, UDP, service measurements at one or more points in the stack, IP layer processing, VPN/IPSEC, PPP, access control, traffic classification, traffic queuing, traffic routing, traffic QOS, traffic demand reporting to QOS allocation servers, traffic statistics reporting to the QOS servers, traffic QOS reservation requests including by traffic type or app type or service priority to the servers, traffic throttling, traffic statistics gathering, traffic QOS priority identification, modem drivers, modem data encryption, and/or other stack element functionality or features.

In some embodiments, the above discussed service control mechanisms are controlled by policy commands received over the service control link from the servers or other authorized network elements. In some embodiments, the device also reports usage measures to servers or other authorized network elements. In some embodiments, the device also reports QOS demand to the servers or other authorized network elements and/or accepts QOS instructions from the servers or other authorized network elements. In some embodiments, the device reports traffic statistics, projected traffic demand, application usage, projected QOS demand can all be reported to the servers or other authorized network elements for the purpose of provisioning the right amount of data bandwidth and traffic priority to the device, and the servers or other authorized network elements aggregate such reports from many different devices to project needed allocations across the entire network and make global bearer channel level or base station level decisions bearer channel allocation and bearer channel QOS allocation decisions, which can also be tied into a bearer channel provisioning, or bearer channel QOS provisioning apparatus or other authorized network elements located in the access network.

For example, as will now be apparent to one of ordinary skill in the art in view of the various embodiments described herein, additional security measures, can be added in some embodiments to augment the secure service partitioning, including, for example, access control integrity checks. For example, in addition to the service control policy instructions that can be received from the servers or other authorized network elements, an intermediate policy control agent can be present to make additional higher level decisions on how instantaneous policy should be implemented.

As shown in FIG. 3, the modem control link, shown as modem local channel 330, provides a link from local connection to the host service control link 118, which in turn connects through the host secure channel 150 to the service controller 152. This communication channel can also be implemented or configured to provide for encrypted communication and, in some embodiments, can be used as an alternative to the direct connection from the modem service control link to the network service control link as disclosed with respect to other figures and various embodiments as described herein.

As shown in FIG. 3, the final stack elements that feed or communicate with the modem bus driver 121 are the protected DAS network stack elements 310 located in the protected DAS execution partition 314 (illustrated as a solid line in FIG. 3), or, in some embodiments, can be the network stack elements 308 located in the kernel execution partition 312 (illustrated as a dashed line in FIG. 3). In some embodiments, these final stack elements feed or communicate with the modem subsystem 125. In some embodiments, the modem subsystem 125 includes an encrypted link so that the stack elements 310 in the protected DAS execution partition 314 can communicate with the modem 128 but other software programs or hardware elements cannot, for example, thereby preventing the service measures and/or controls from being inappropriately bypassed or otherwise comprised. For example and as similarly discussed above, the modem subsystem 125, for example, can include its own the protected execution partition using various techniques described herein. The modem protected execution partition, for example, can also include a service measure (e.g., modem agent 226 can provide such a service measurement point in the modem subsystem 125, as similarly described above with respect to FIG. 2) to increase service control integrity verification as depicted by service measure. The modem service measure can be included in protected execution partition that can only be accessed by the service controller 122 by way of the modem local channel 330, or the modem service measure can only be accessed by another DAS agent 310 in protected execution partition 314. In some embodiments, the modem local channel 330 is implemented as a secure channel (e.g., an encrypted communication channel between the modem service control link 130 and the host service control link 118). As described herein, the modem driver can reside in protected service execution environment, or the modem traffic can be encrypted within service execution environment. For example, the encryption settings can be controlled by various secure control servers.

Figure 4:
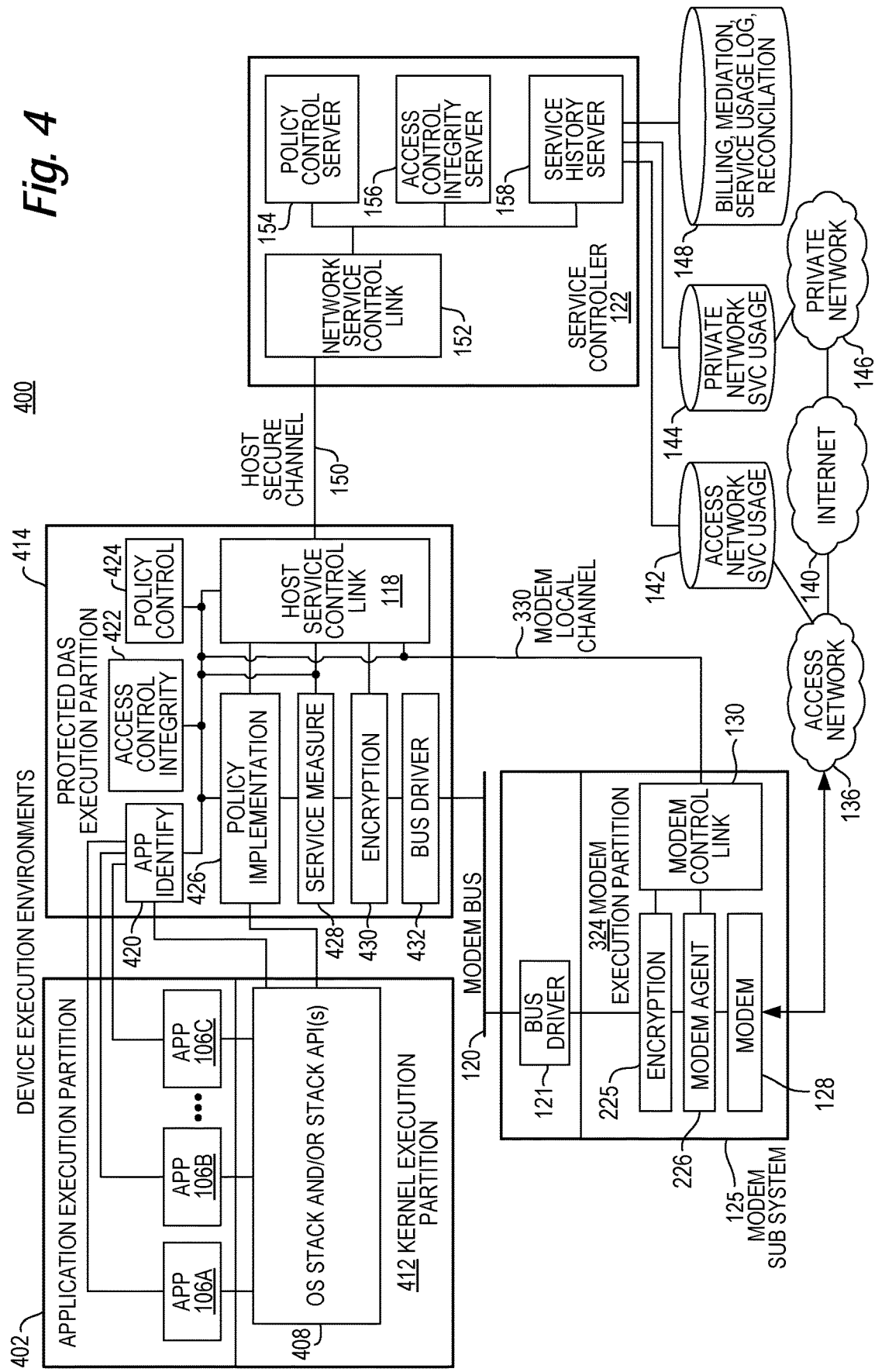
FIG. 4 illustrates another secure execution environment for device assisted services in accordance with some embodiments.

FIG. 4 illustrates another secure execution environment 400 for device assisted services in accordance with some embodiments. In particular, FIG. 4 illustrates a direct stack manipulation option performed by the DAS agents executed in the protected DAS execution partition 414, including, as shown, an app(lication) identify agent 420, an access control integrity agent 422, a policy control agent 424, a policy implementation agent 426, a service measure/service monitoring agent 428, a modem encryption agent 430, and a bus driver 432. For example, the policy implementation agent 426 performs access control and/or traffic shaping according a set of service control policies. The service control policies, for example, can be set by the service controller 122 or by the service controller 122 in coordination with the policy control agent 422. As shown the app identify agent 420 is in communication with the various applications 106A through 106C executed in the application execution partition 402. As also shown, the various applications 106A through 106C executed in the application execution partition 402 are in communication with the OS stack and/or stack API(s) 408 executed in the kernel execution partition 412.

In some embodiments, the protected service measure agent 428, the modem encryption agent 430, the modem driver agent 432, the application identifier agent 420, the access control integrity agent 422, and the policy control agent 424 are all implemented in protected DAS partition 414, as shown. In some embodiments, as will now be apparent to one of ordinary skill in the art, a subset of these functions can be implemented in a protected execution partition, such as the protected DAS partition, in various circumstances.

FIG. 4 also similarly shows various embodiments that are available for network based service usage measures and interfacing to the mediation and billing systems, and it should be understood that any or all of the embodiments and figures can be employed in the context of carrier networks, MVNOs, private networks, or open networks supporting enterprise IT manger controls, parental controls, multi-network controls, and/or roaming controls.

Figure 5:
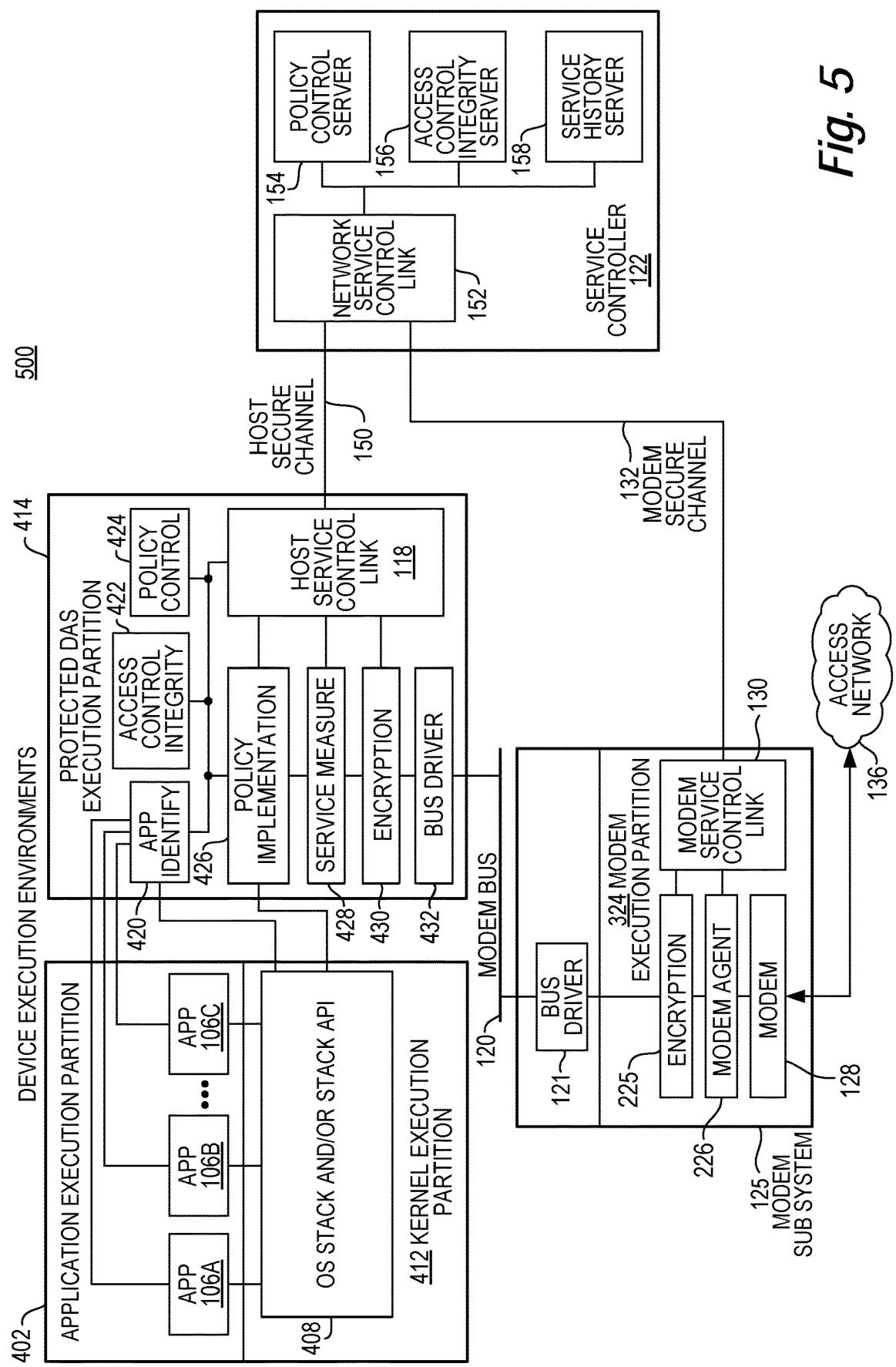
FIG. 5 illustrates another secure execution environment for device assisted services in accordance with some embodiments.

FIG. 5 illustrates another secure execution environment 500 for device assisted services in accordance with some embodiments. In particular, FIG. 5 is similar to that FIG. 4 except that FIG. 5 illustrates a modem service control link 132 that is connected directly to the service controller 122 via the network service control link 152 (e.g., via a modem secure channel). In some embodiments, a modem control link for DAS is established locally on the device or through an entirely different control channel, which, in some embodiments, provides enhanced security as discussed herein (e.g., it is very difficult to hack a service usage measure or service control that cannot be accessed on the device).

Figure 6:
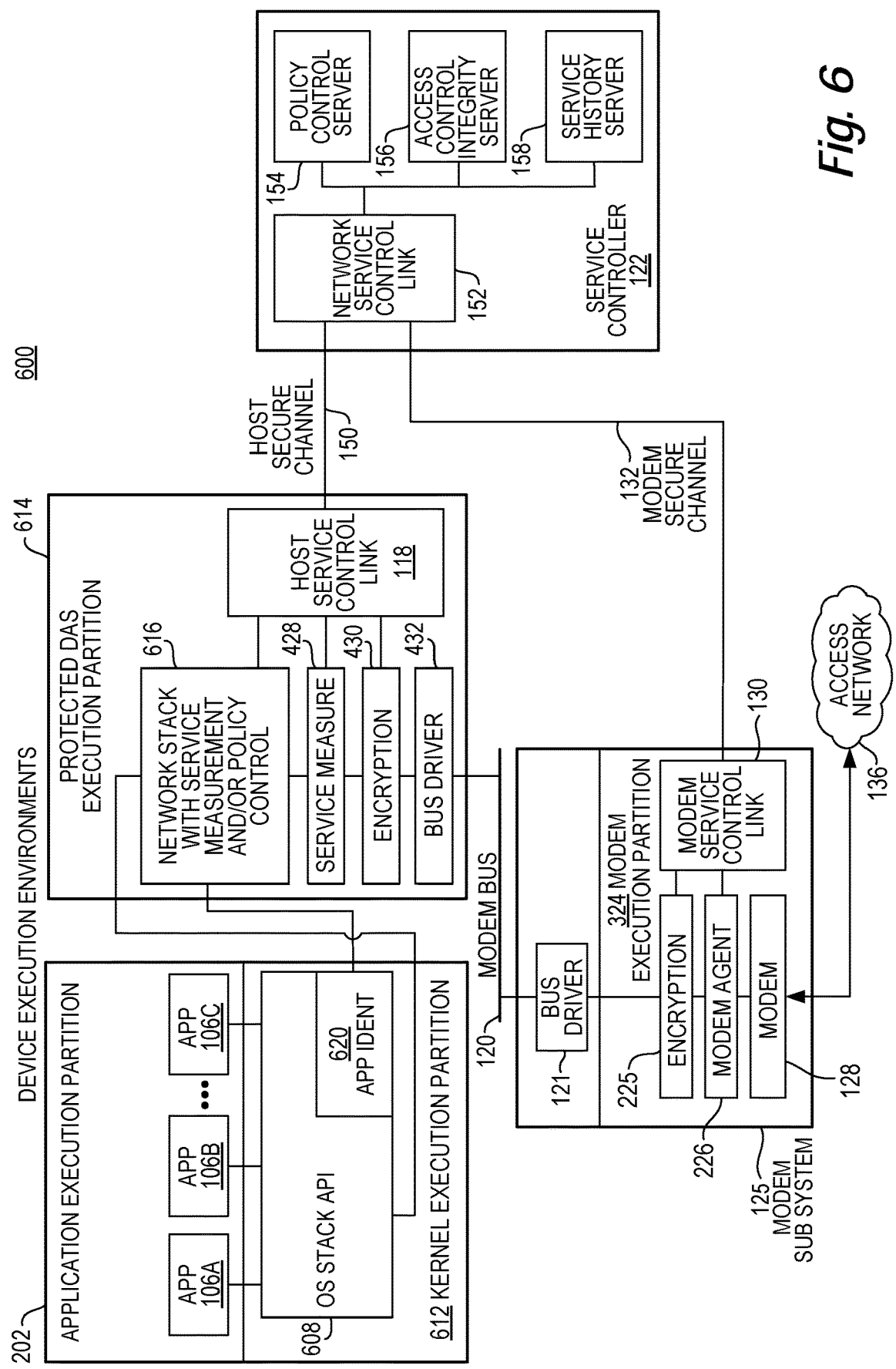
FIG. 6 illustrates another secure execution environment for device assisted services in accordance with some embodiments.

FIG. 6 illustrates another secure execution environment 600 for device assisted services in accordance with some embodiments. In particular, FIG. 6 illustrates a policy implementation agent 616 that includes the entire networking stack running in protected execution partition 614 and an OS stack API 608 that includes an application identifying function 620 in the kernel execution partition 612.

Figure 7:
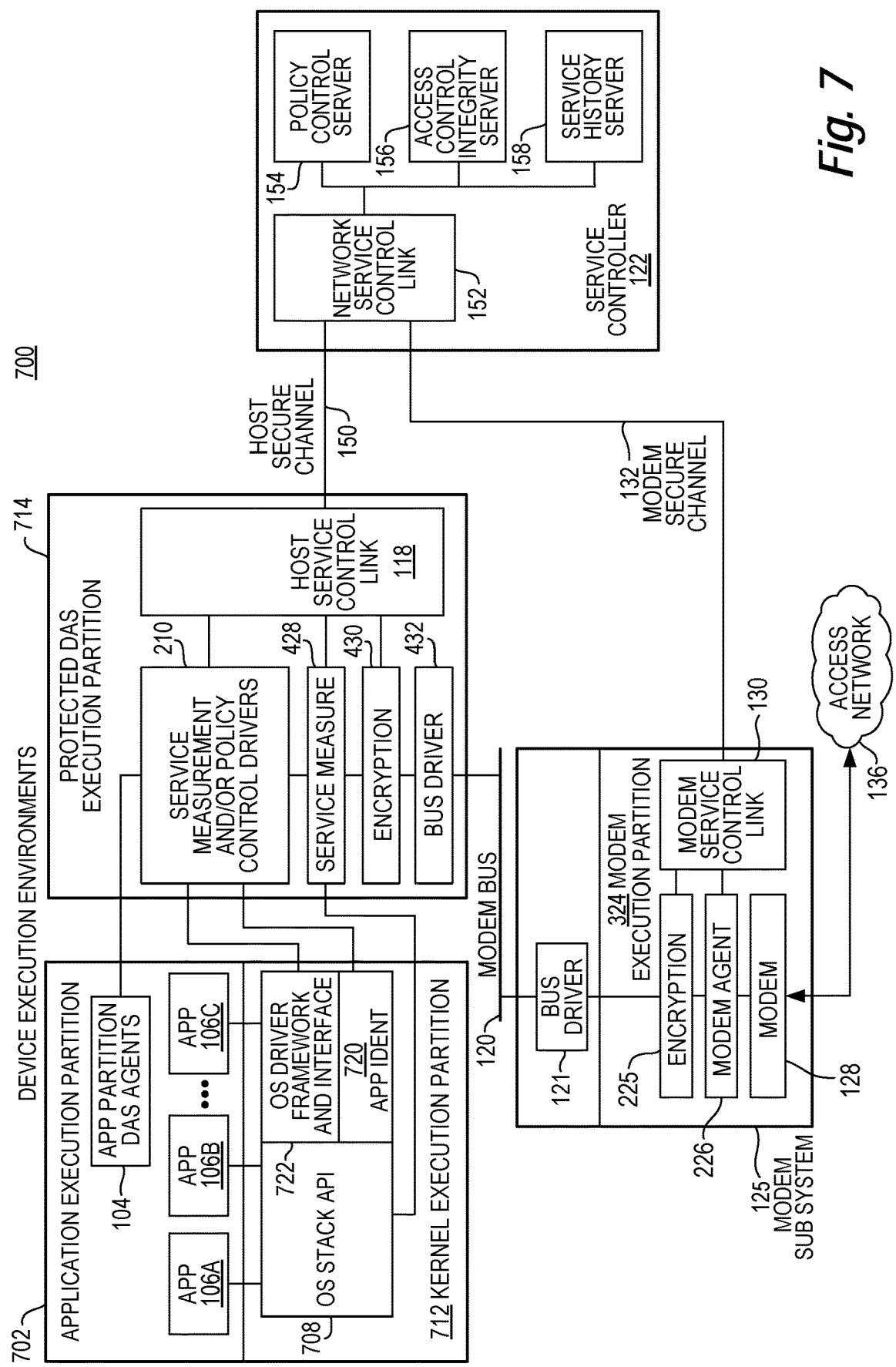
FIG. 7 illustrates another secure execution environment for device assisted services in accordance with some embodiments.

FIG. 7 illustrates another secure execution environment 700 for device assisted services in accordance with some embodiments. In particular, FIG. 7 illustrates DAS agents that do not replace the OS network stack elements, but instead one or more DAS agents are comprised of device driver programs that interface into the network stack and pass traffic information or actual traffic back and forth with the stack. These device driver interface constructs are labeled OS driver framework and interface 722 in FIG. 7 as similarly shown in and described with respect to FIG. 2, along with OS stack API 708, which includes application identifier function 720 as similarly discussed above with respect to FIG. 6, and are executed in kernel execution partition 712. Also, as shown, application partition DAS agents 104 are executed in application execution partition 702. The main difference between the embodiment in FIG. 7 and that shown in and described with respect to FIG. 2 is that the service measure agent 428, modem encryption agent 430, and modem driver agent 432 are executed in the protected DAS partition 714, as shown in FIG. 7. For example, this provides for enhanced service control security as described herein with respect to various embodiments.

Figure 8:
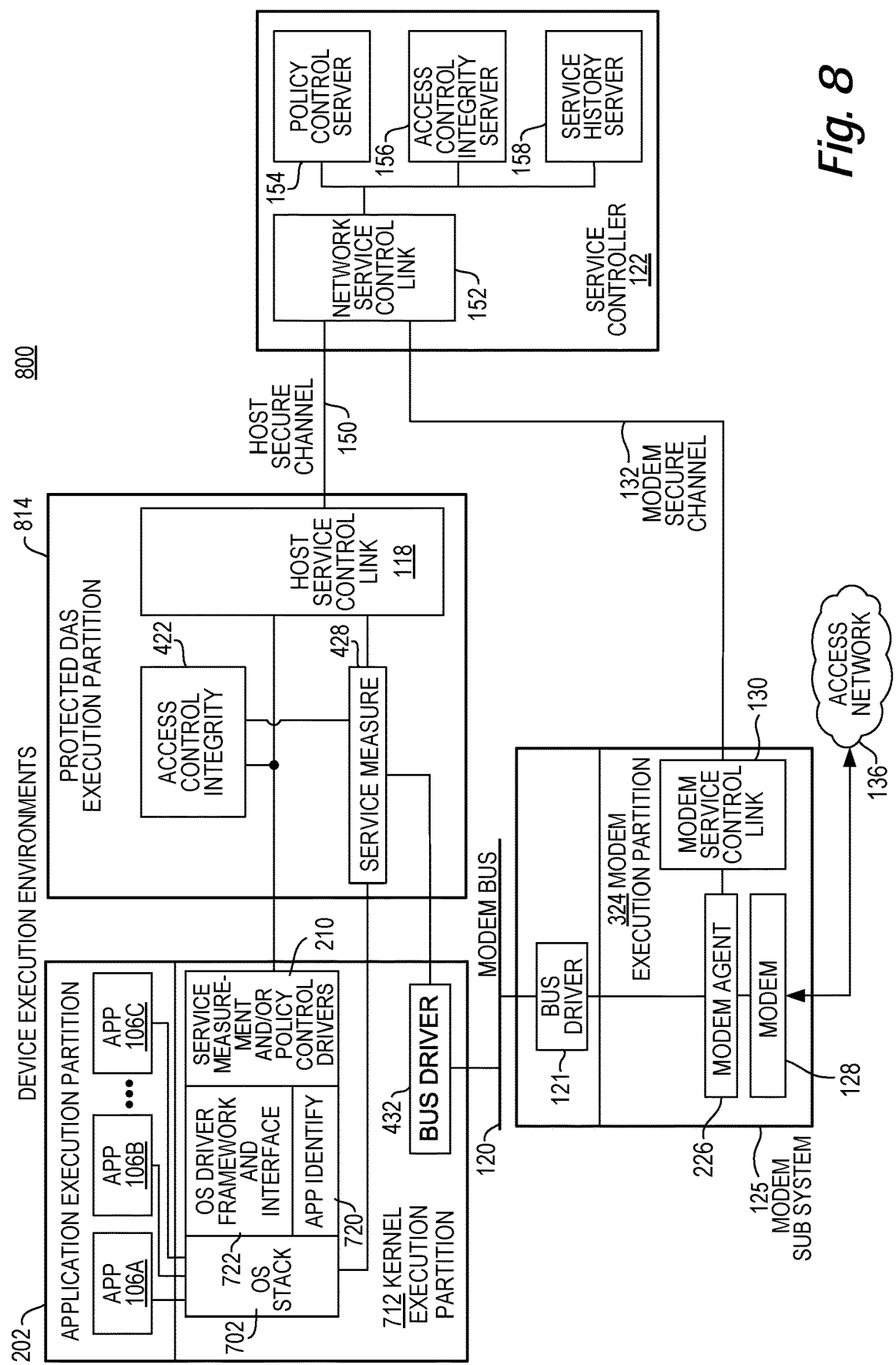
FIG. 8 illustrates another secure execution environment for device assisted services in accordance with some embodiments.

FIG. 8 illustrates another secure execution environment 800 for device assisted services in accordance with some embodiments. In particular, FIG. 8 illustrates a more simplified embodiment that is similar to that of FIG. 7. In FIG. 8, only an access control integrity agent 422 and a service measure 428 are executed in protected DAS partition 814, and the bus driver 432 and the service measurement and/or policy control drivers 210 are executed in the kernel execution partition 712. This embodiment illustrates that provided that at least one protected service measure is provided on the device, then the DAS service control integrity can be very high. For example, if it is not possible to access the program code or control traffic for the service measure agent 428, and the host service control link 118 except through the encrypted control channel from the service controller 122, then this simplified configuration can be almost as secure as that possible with network based service measures. It will now be apparent to one of ordinary skill in the art that this technique similarly applies to a service measure and control link similarly implemented in a protected modem execution partition 324. In some embodiments, the access control integrity agent 422 provides additional security, for example, in the event that the protected DAS partition 814 is breached or compromised.

Figure 9:
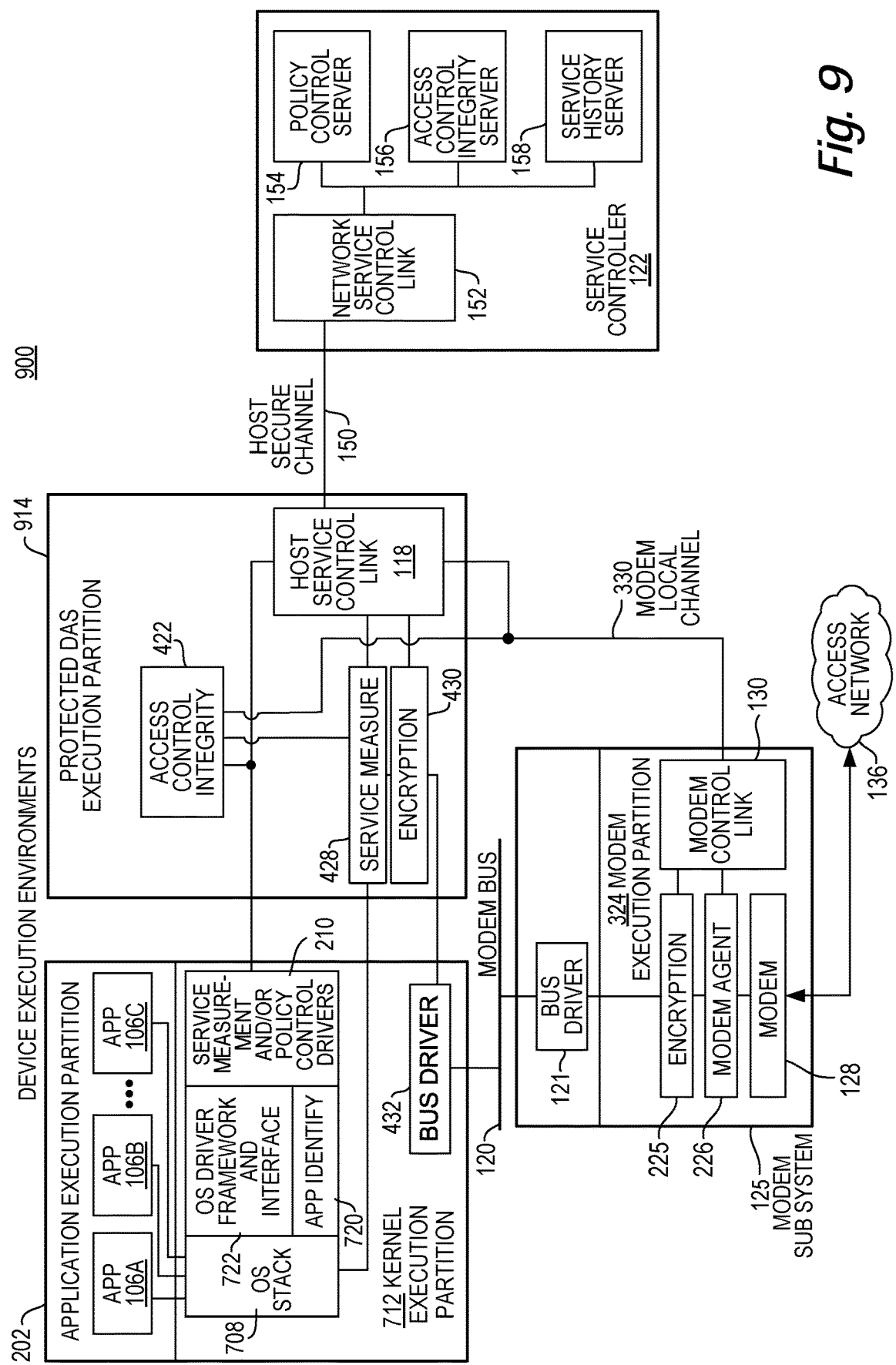
FIG. 9 illustrates another secure execution environment for device assisted services in accordance with some embodiments.

FIG. 9 illustrates another secure execution environment 900 for device assisted services in accordance with some embodiments. In particular, FIG. 9 illustrates an embodiment similar to that of FIG. 8 except that, in particular, in addition to the service measure being executed in protected DAS partition 914, the modem encryption agent 430 is also implemented in/executed in the protected DAS partition 914. For example, this prevents unauthorized software from defeating the service measurements and/or service controls by going around the network stack directly to the modem.

Figure 10:
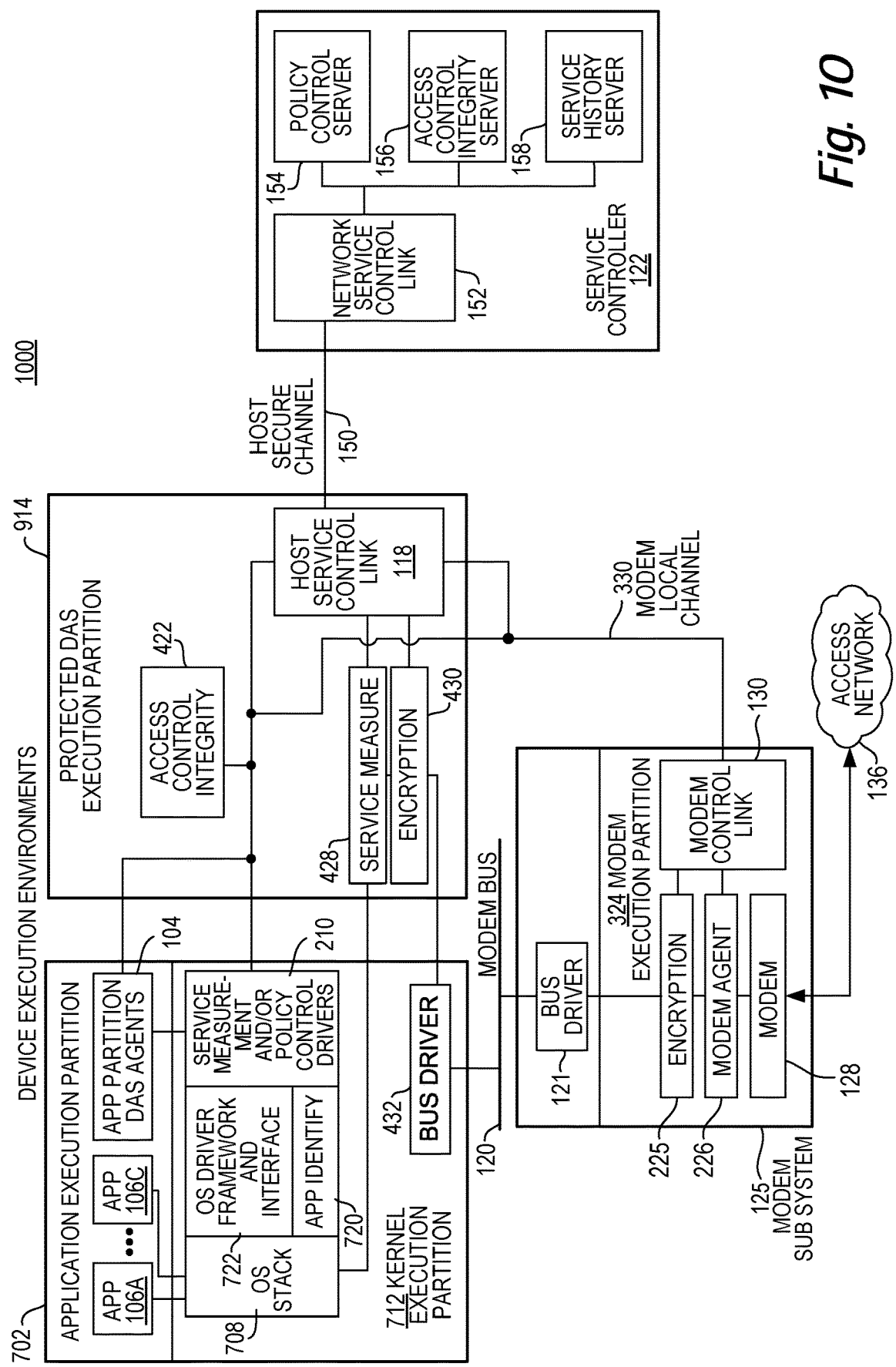
FIG. 10 illustrates another secure execution environment for device assisted services in accordance with some embodiments.

FIG. 10 illustrates another secure execution environment 1000 for device assisted services in accordance with some embodiments. In particular, FIG. 10 illustrates an embodiment similar to that of FIG. 9 except that, in particular, there are additional app partition DAS agents 104 executing in the application execution partition 702. For example, this illustrates that some DAS agents can be implemented in application space (e.g., UI agent, policy control agent, and various other DAS agents as described herein) while still maintaining a high level of service measurement and/or control security as long as there are a few key measures and/or controls implemented in protected execution partitions using the various techniques described herein.

Figure 11:
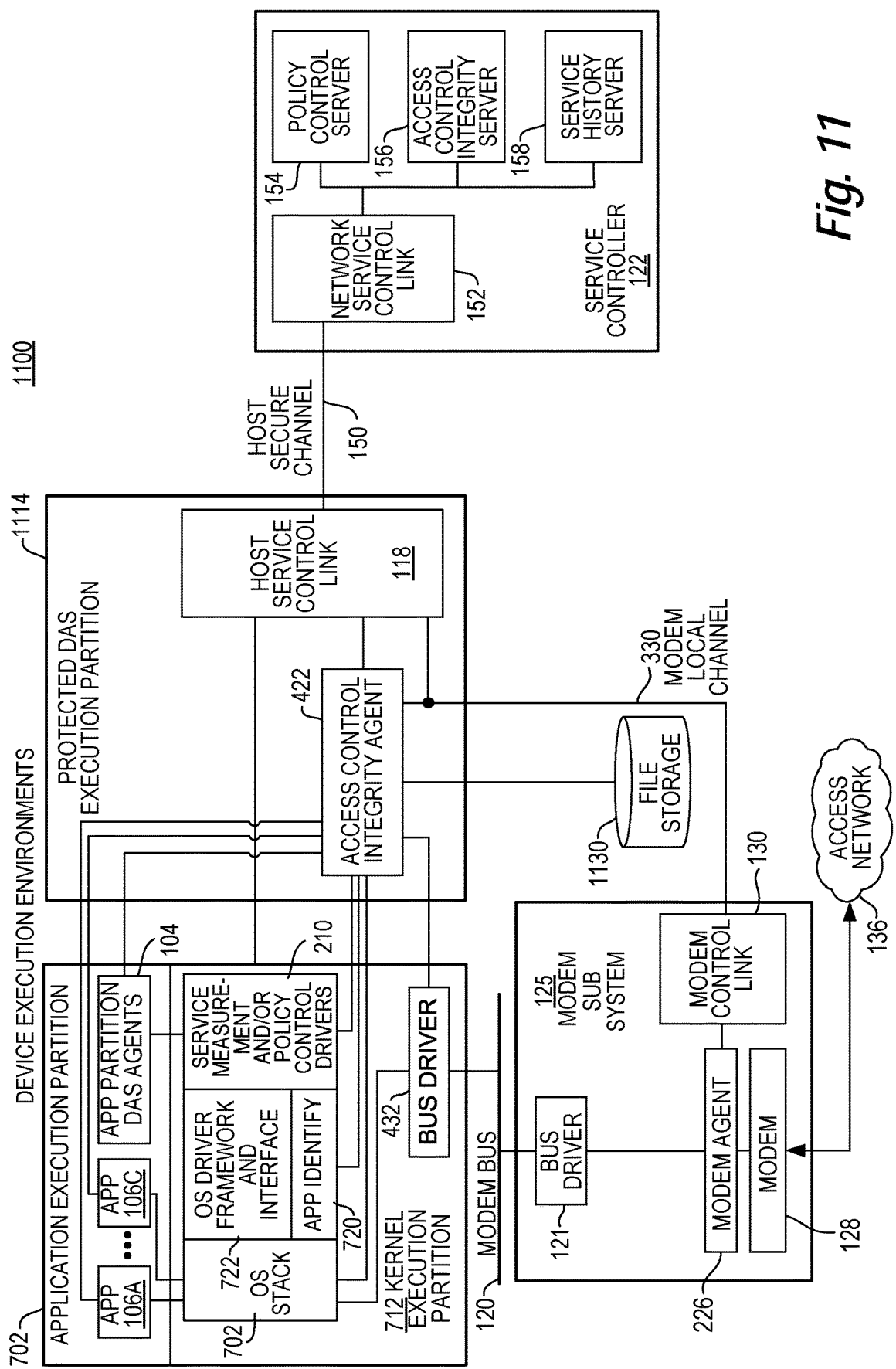
FIG. 11 illustrates another secure execution environment for device assisted services in accordance with some embodiments.

FIG. 11 illustrates another secure execution environment 1100 for device assisted services in accordance with some embodiments. In particular, FIG. 11 illustrates how the server cloud can be assisted by the on board access control integrity agent to detect tampering with other service measurement(s) and/or control agent(s), or to protect the service measurement and/or control system from being attacked by malware and/or otherwise comprised. As shown, the access control integrity agent 422 executes inside the protected DAS partition 1114 and is in communication with file storage 1130 (e.g., for persistently maintaining device status and/or other settings or status or monitoring information). The access control integrity agent 422 performs the various access control integrity check functions as, for example, described herein with respect to various embodiments, and, in some embodiments, in coordination with the servers over the secure control channel (e.g., host secure channel 150). In some embodiments, the access control integrity agent 422 can send the service controller 122 information about the other service measurements and/or control agents so that the service controller 122 can determine if the agents are working properly or have been tampered with or otherwise compromised. For example, such information can include sections of code, hashes, code segments, code variations from a previous image, code variations from a historical image, responses to queries, checksums, observations of operating behavior or patterns, service usage, policy implementation behavior, and/or other information that may be indicative of tampering, corruption, and/or a compromise of any of the device agents/measures. In some embodiments, the access control integrity agent 422 checks the operating environment for signs of malware signatures, or sends application and/or driver information or other information about the operating environments to the servers for further processing to detect malware. In some embodiments, the access control integrity agent 422 performs basic operations on protected DAS partition memory, kernel execution partition memory areas, application execution partition memory areas, on disk storage areas or on other file storage areas to detect known malware hashes or signatures, etc., or the access control integrity agent 422 can send the hashes to the servers for comparison against malware databases (e.g., to compare against signatures for known malware or for further behavioral based or other security/malware detection techniques).

In some embodiments, the DAS system is implemented in a manner that is robust to losses in service control link (e.g., coverage outages on a WWAN link or loss of connection on a wired link). In some embodiments, the DAS system to be implemented in a manner that is robust to one or more server elements in the service controller going offline or failing for any reason. The following embodiments facilitate these techniques, as described below.

In some embodiments, it is advantageous for one or more of the device assisted service agents to maintain a record of the service usage reports and/or other reporting that is provided to the service controller regarding device service control state (e.g., present service plan settings, current service usage policy settings, current user preference settings, current DAS settings, current encrypted control channel and/or local encrypted communication channel key information, current DAS agent status reports, current DAS agent security state reports, current ambient service usage and/or transaction records, current service control integrity threat reports, user status information, device status information, application status information, device location, device QOS state, and/or other state and/or settings information). In addition to such information that exists on the device and is reported to the service controller, additional service information can be derived and recorded in the service controller, such as information received from outside the device and/or analysis of the device reported information (e.g., network based service usage measures, analysis of device service usage, comparison of device reports with other information, analysis of access control integrity agent reports, information received from roaming networks, information input to the service controller from parental control terminals, enterprise control terminals, virtual service provider control terminals, access network authorization information, service integrity violation level, and many other types of information used to properly measure and/or control the device services). For example, the information reported from the device and received or derived outside the device that is required to adequately define the actions needed from the service controller to maintain proper DAS system operation is sometimes referred to herein as the "device service state."

In some embodiments, the service controller functions are highly scalable and can be executed on a number of hardware and software platforms (e.g., different virtual machines in a server, different servers in a data center, or different servers located in different data centers). For example, in such embodiments the service controller can be designed so that the programs that execute the various service controller server functions can derive all of the information necessary to properly manage the device at any moment in time by knowing past device service state and current service state that adequately define the next set of actions the service controller needs to implement to properly maintain the DAS system operation. By designing the system in this way, if the server that is running the service controller server functions for any given device in question were to go down or become disconnected from the device, then another server could later resume proper operation of the DAS system by assigning another service controller server function to the device and recovering or restoring the necessary past device service state and the necessary current device service state.

For example, this can be accomplished in some embodiments as described below. The service controller saves the current device service state into a common database (e.g., which can be centralized or distributed) that is available to all service controller server functions. The device service state is saved each time the device communicates with the service controller, or at regular time intervals, or a combination of both. The device retains its current and past service state reports even after they are reported at least until the service controller sends the device a message confirming that the service controller has saved a given device service state. Once the device receives this save confirmation for a given device state report then it is no longer required to retain that particular device state report once the device has no further use for it. In this manner, if a service controller server function goes down then a save confirmation for one or more reported device states is not transmitted to the device by the service controller, and the device can retain that report. A server load balancer detects that a given service controller server function has gone down, looks up the devices that were being controlled by that service controller server function, finds that the device in question was one of those devices and re-assigns a new service controller server function (either in the same data center or in another data center) to control the device in question. The newly assigned service controller server function then recovers all past device states that were recorded in the service controller database and are required to properly manage the DAS system, and then asks the device to transmit or re-transmit all device state reports that were not saved in the service controller database. Once the device transmits or re-transmits the requested information, the newly assigned service controller function then has the information it needs to properly manage the DAS system, it saves all the reported device state information, and then sends save confirmations to the device so that the device need no longer retain the older service state reports. The newly assigned service controller server function can then resume the DAS system operation with a set of actions that are identical or very similar to the actions that would have been taken by the original service controller server function if it had not gone down. One of ordinary skill in the art will now appreciate that the above techniques can also be used to accommodate temporary losses in the connection between the device and the service controller. For example, such techniques provide for a highly scalable and robust approach to implement a distributed service controller across multiple data centers for reliable service redundancy. In some embodiments, the past device service state information is saved in the protected DAS execution partition and/or the modem execution partition, for example, so that it is protected from corruption.

Although the foregoing embodiments have been described in some detail for purposes of clarity of understanding, the invention is not limited to the details provided.

There are many alternative ways of implementing the invention. The disclosed embodiments are illustrative and not restrictive.

INCORPORATION BY REFERENCE

This application incorporates the following provisional and nonprovisional U.S. patent applications by reference: application Ser. No. 12/694,445, filed Jan. 27, 2010, entitled SECURITY TECHNIQUES FOR DEVICE ASSISTED SERVICES; application Ser. No. 12/380,780, filed Mar. 2, 2009, entitled AUTOMATED DEVICE PROVISIONING AND ACTIVATION; Application No. 61/206,354, filed Jan. 28, 2009, entitled SERVICES POLICY COMMUNICATION SYSTEM AND METHOD; provisional Application No. 61/206,944, filed Feb. 4, 2009, entitled SERVICES POLICY COMMUNICATION SYSTEM AND METHOD; provisional Application No. 61/207,393, filed Feb. 10, 2009, entitled SERVICES POLICY COMMUNICATION SYSTEM AND METHOD; provisional Application No. 61/207,739, filed Feb. 13, 2009, entitled SERVICES POLICY COMMUNICATION SYSTEM AND METHOD; and provisional Application No. 61/252,151, filed on Oct. 15, 2009, entitled SECURITY TECHNIQUES FOR DEVICE ASSISTED SERVICES.

What is claimed is:

1. A communications device comprising:
   a processor configured to execute instructions to:
      implement a service profile executed at least in part in a secure execution environment, the service profile for assisting control of usage by the communications device of a service over the wireless network, wherein the service profile includes one or more service policy settings, and wherein at least one of the one or more service policy settings is configured to assist in controlling access to the service over the wireless network; and
      monitor an attempted or successful use of the service over the wireless network; and
   a memory coupled to the processor and configured to provide the processor with the instructions.

2. The communications device of claim 1, wherein the memory includes a secure partition storing the service profile and accessible only from the secure execution environment.

3. The communications device of claim 1, wherein the processor is configured to execute the instructions to:
   operate a host service control link in the secure execution environment to connect securely to a network service controller through a control channel, the host service control link is configured to:
      receive one or more messages from the network service controller through the control channel; and
      based on the one or more messages, update the one or more service policy settings.

4. The communications device of claim 1, wherein the processor is configured to execute the instructions to:
   verify the monitored attempted or successful use of the service over the wireless network.

5. The communications device of claim 1, wherein the processor is configured to execute the instructions to:
   send service usage information about the monitored attempted or successful use of the service over the wireless network to a network element.

6. The communications device of claim 1, wherein the communications device is a mobile communications device or an intermediate networking device, and the service includes one or more Internet based services.

7. The communications device of claim 1, wherein the communications device is a mobile communications device including a mobile phone, a personal digital assistant (PDA), an eBook reader, a music device, an entertainment device, a gaming device, a computer, laptop, a netbook, a tablet, or a home networking system.

8. The communications device of claim 1, wherein the service profile is configured to allow for access to the service with service capabilities that are controlled based on one or more of a period of time, a network address, a service type, a content type, an application type, a bandwidth, or a data usage.

9. The communications device of claim 1, wherein the service is associated with a quality of service (QOS), and wherein the service profile is configured to assist in providing the service with the QOS.

10. The communications device of claim 1, wherein the service profile is configured to assist in authorizing the communications device to use the wireless network.

11. A method for use by a communications device, the method comprising:
   implementing a service profile executed at least in part in a secure execution environment, the service profile for assisting control of usage by the communications device of a service over the wireless network, wherein the service profile includes one or more service policy settings, and wherein at least one of the one or more service policy settings is configured to assist in controlling access to the service over the wireless network; and
   monitoring an attempted or successful use of the service over the wireless network.

12. The method of claim 11, wherein the communications device includes a secure partition storing the service profile and accessible only from the secure execution environment.

13. The method of claim 11, further comprising:
   operating a host service control link in the secure execution environment to connect securely to a network service controller through a control channel, wherein the host service control link receives one or more messages from the network service controller through the control channel, and based on the one or more messages, updates the one or more service policy settings.

14. The method of claim 11, further comprising:
   verifying the monitored attempted or successful use of the service over the wireless network.

15. The method of claim 11, further comprising:
   sending service usage information about the monitored attempted or successful use of the service over the wireless network to a network element.

16. The method of claim 11, wherein the communications device is a mobile communications device or an intermediate networking device, and the service includes one or more Internet based services.

17. The method of claim 11, wherein the communications device is a mobile communications device including a mobile phone, a personal digital assistant (PDA), an eBook reader, a music device, an entertainment device, a gaming device, a computer, laptop, a netbook, a tablet, or a home networking system.

18. The method of claim 11, wherein the service profile allows for access to the service with service capabilities that are controlled based on one or more of a period of time, a network address, a service type, a content type, an application type, a bandwidth, or a data usage.

19. The method of claim 11, wherein the service is associated with a quality of service (QOS), and wherein the service profile assists in providing the service with the QOS.

20. The method of claim 11, wherein the service profile assists in authorizing the communications device to use the wireless network.

\* \* \* \* \*